US012553354B2

(12) United States Patent
Ramb et al.

(10) Patent No.: US 12,553,354 B2
(45) Date of Patent: Feb. 17, 2026

(54) TURBINE ARRANGEMENT WITH SEPARATE GUIDANCE DEVICE

(71) Applicant: BorgWarner Inc., Auburn Hills, MI (US)

(72) Inventors: Thomas Ramb, Worms (DE); Bernhard Dreher, Kaiserslautern (DE); Patrick Weber, Niederkirchen (DE); Alexander Umlauff, Framersheim (DE); Ahmet Coksen, Mannheim (DE)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 18/989,858

(22) Filed: Dec. 20, 2024

(65) Prior Publication Data

US 2025/0179925 A1    Jun. 5, 2025

Related U.S. Application Data

(63) Continuation of application No. 17/316,788, filed on May 11, 2021, now Pat. No. 12,209,511.

(30) Foreign Application Priority Data

Apr. 7, 2021 (DE) .......................... 102021108686.8

(51) Int. Cl.
*F01D 9/04* (2006.01)
*F01D 25/16* (2006.01)
(Continued)

(52) U.S. Cl.
CPC ............. *F01D 9/041* (2013.01); *F01D 25/16* (2013.01); *F01D 25/24* (2013.01); *F01D 25/28* (2013.01);
(Continued)

(58) Field of Classification Search
CPC .......... F01D 9/041; F01D 25/16; F01D 25/24; F01D 25/28; F02C 6/12
See application file for complete search history.

(56) References Cited

U.S. PATENT DOCUMENTS

| 6,145,313 A | 11/2000 | Arnold |
| 6,925,806 B1 | 8/2005 | Zollinger et al. |

(Continued)

FOREIGN PATENT DOCUMENTS

| DE | 4242494 C1 | 9/1993 |
| DE | 112011102556 T5 | 5/2013 |

(Continued)

OTHER PUBLICATIONS

English language abstract for DE 11 2015 000 631 T5 extracted from espacenet.com database on May 13, 2021, 2 pages.

(Continued)

*Primary Examiner* — Courtney D Heinle
*Assistant Examiner* — Cameron A Corday
(74) *Attorney, Agent, or Firm* — Howard & Howard Attorneys PLLC

(57) ABSTRACT

Disclosed is a turbine arrangement for a supercharging device. The turbine arrangement comprises a turbine housing, a turbine wheel and a guide device. The turbine housing defines a turbine spiral and a turbine outlet. The turbine wheel is arranged in the turbine housing between the turbine spiral and the turbine outlet. The guide device comprises a carrier ring and multiple guide blades. The guide blades are arranged on the carrier ring fixedly in a predetermined orientation. The guide device is arranged in an inflow channel between the turbine spiral and the turbine wheel such that, during operation, fluids are conducted from the turbine spiral through the inflow channel over the guide blades onto the turbine wheel.

14 Claims, 17 Drawing Sheets

(51) Int. Cl.
  *F01D 25/24* (2006.01)
  *F01D 25/28* (2006.01)
  *F02C 6/12* (2006.01)
(52) U.S. Cl.
  CPC ............ *F02C 6/12* (2013.01); *F05D 2220/40* (2013.01); *F05D 2240/12* (2013.01); *F05D 2260/231* (2013.01); *F05D 2260/31* (2013.01)

(56) References Cited

U.S. PATENT DOCUMENTS

| | | |
|---|---|---|
| 7,001,142 B2 | 2/2006 | Knauer et al. |
| 7,189,058 B2 | 3/2007 | Metz et al. |
| 7,574,862 B2 | 8/2009 | Giselmo et al. |
| 7,600,969 B2 | 10/2009 | Frankenstein et al. |
| 8,616,837 B2 | 12/2013 | Scholz et al. |
| 8,727,711 B2 | 5/2014 | Boning et al. |
| 8,857,178 B2 | 10/2014 | O'Hara |
| 8,932,008 B2 | 1/2015 | Boening et al. |
| 9,845,770 B2 | 12/2017 | Martinez-Botas et al. |
| 10,240,469 B2 | 3/2019 | Rylance et al. |
| 11,248,488 B2 * | 2/2022 | Eckl .................. F02B 37/025 |
| 12,209,511 B2 | 1/2025 | Ramb et al. |
| 2009/0053044 A1 | 2/2009 | Ward |
| 2010/0316490 A1 | 12/2010 | Severin et al. |
| 2012/0023936 A1 * | 2/2012 | Kruiswyk ............... F01D 9/045 415/199.2 |
| 2013/0000300 A1 * | 1/2013 | O'Hara .................. F01D 9/026 60/605.1 |
| 2014/0338328 A1 * | 11/2014 | Lusardi .................. F01D 9/047 60/605.2 |
| 2015/0016968 A1 * | 1/2015 | Grabowska ............. F02B 37/24 415/148 |
| 2019/0301358 A1 | 10/2019 | Bozek et al. |
| 2020/0291800 A1 * | 9/2020 | Eckl ...................... F01D 9/026 |
| 2020/0300161 A1 | 9/2020 | Rost et al. |
| 2022/0325631 A1 | 10/2022 | Ramb et al. |

FOREIGN PATENT DOCUMENTS

| | | |
|---|---|---|
| DE | 112015000631 T5 | 12/2016 |
| DE | 102019107093 A1 | 9/2020 |
| DE | 102021108686 A1 | 10/2022 |
| EP | 0024275 A1 | 3/1981 |

OTHER PUBLICATIONS

English language abstract and machine-assisted English translation for DE 42 42 494 C1 extracted from espacenet.com database on Dec. 15, 2021, 12 pages.

English language abstract for DE 11 2011 102 556 T5 extracted from espacenet.com database on Dec. 15, 2021, 2 pages.

English language abstract for DE 10 2019 107 093 A1 extracted from espacenet.com database on Dec. 15, 2021, 2 pages.

English language abstract and machine-assisted English translation for EP 0 024 275 A1 extracted from espacenet.com database on Dec. 15, 2021, 9 pages.

DE 42 42 494 C1, Sep. 9, 11963, Machine-Assisted English Translation.

DE 11 2015 000 631 T5, Dec. 1, 2016, U.S. Pat. No. 10,240,469 B2.

DE 11 2011 102 556 T5, May 13, 2018, U.S. 2012/0023936 A1.

DE 10 2019 107 093 A1, Sep. 24, 2020, U.S. 2020/0300161 A1.

EP 0 024 275 A1, Mar. 4, 1981, Machine-Assisted English Translation.

English language abstract for DE 10 2021 108 686 A1 extracted from espacenet.com database on May 7, 2025, 2 pages.

United States Non-Provisional U.S. Appl. No. 19/200,875, filed May 7, 2025.

* cited by examiner

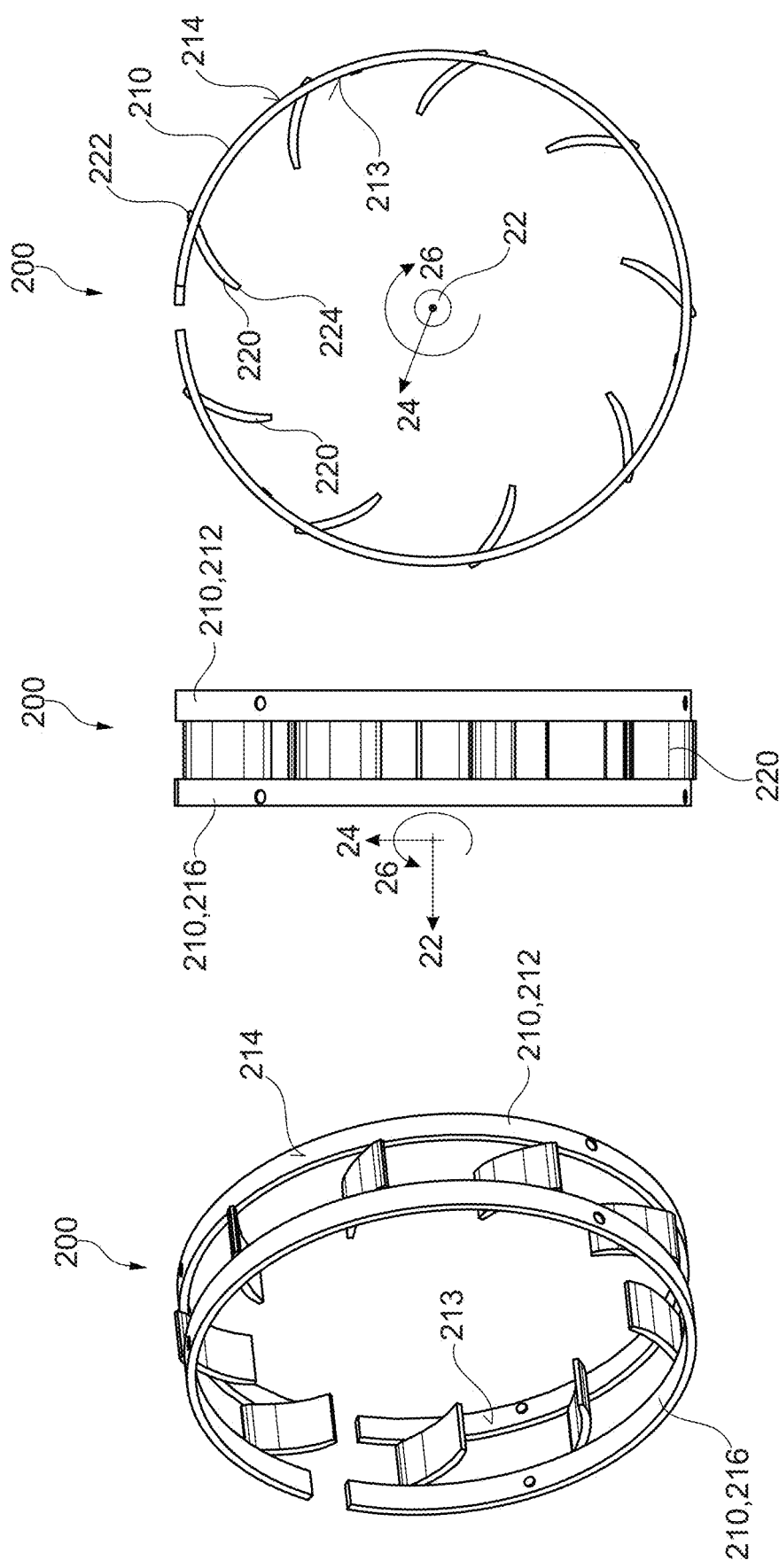

TURBINE ARRANGEMENT WITH SEPARATE GUIDANCE DEVICE

CROSS-REFERENCE TO RELATED APPLICATIONS

The present application is a continuation of U.S. Non-Provisional patent application Ser. No. 17/316,788, filed May 11, 2021, which claims priority to and all the benefits of German Patent Application No. 102021108686.8, filed Apr. 7, 2021, the disclosure of which is expressly hereby incorporated herein by reference in its entirety.

TECHNICAL FIELD

The present invention relates to a turbine arrangement for a supercharging device, having a guide device with fixed guide blades. The invention furthermore relates to a supercharging device having a turbine arrangement of said type.

BACKGROUND

Ever-increasing numbers of vehicles of the newer generation are being equipped with supercharging devices in order to achieve the required aims and satisfy legal regulations. In the development of supercharging devices, it is the aim to optimize the individual components and the system as a whole with regard to their reliability and efficiency.

Known supercharging devices normally have at least one compressor with a compressor wheel which is connected to a drive unit via a common shaft. The compressor compresses the fresh air that is drawn into the internal combustion engine or for the fuel cell. In this way, the air or oxygen quantity that is available to the engine for combustion or to the fuel cell for reaction, respectively, is increased. This in turn leads to an increase in performance of the internal combustion engine or of the fuel cell respectively. Supercharging devices may be equipped with different drive units. In particular, electric superchargers, in the case of which the compressor is driven by means of an electric motor, and turbochargers, in the case of which the compressor is driven by means of a turbine, are known in the prior art. Combinations of the two systems are also described in the prior art.

In order to increase the efficiency of turbines and adapt it to different operating points, variable guide blades are commonly used in turbines, which variable guide blades can be adjusted such that an incident-flow angle and a flow cross section of the flow that is conducted onto the turbine wheel can be variably set. Such systems are also known as variable turbine geometry or VTG. In addition to these, systems with fixed guide blades are known for the purposes of optimizing individual or a few specific operating points of the turbine. Here, by contrast to VTG guide blades, the fixed guide blades are not adjustable but are arranged in a fixed orientation relative to the turbine housing, such that the flow cross section and the incident-flow angle, once fixed, can no longer be variably adjusted but rather are fixed in an manner optimized for an individual or a few specific operating points.

It is an object of the present invention to provide an improved turbine arrangement with fixedly arranged guide blades.

SUMMARY OF THE INVENTION

The present invention relates to a turbine arrangement for a supercharging device as claimed in claim 1.

The turbine arrangement for a supercharging device comprises a turbine housing, a turbine wheel and a guide device. The turbine housing defines a turbine spiral and a turbine outlet. The turbine wheel is arranged in the turbine housing between the turbine spiral and the turbine outlet. The guide device comprises a carrier ring and multiple guide blades. The guide blades are arranged on the carrier ring fixedly in a predetermined orientation. The guide device is arranged in an inflow channel between the turbine spiral and the turbine wheel such that, during operation, fluids are conducted from the turbine spiral through the inflow channel over the guide blades onto the turbine wheel. Here, the predetermined orientation may be an orientation which deviates from an orientation in a circumferential direction toward a more radial or more tangential orientation. In this way, fluids passing from the turbine spiral can be guided more radially or tangentially onto the turbine wheel. In other words, the guide device is arranged such that the fixed guide blades guide a flow from the turbine spiral onto the turbine wheel correspondingly to the predetermined orientation. Assembly and cost advantages arise as a result of the fact that the guide blades are not integrally connected to the turbine housing but are encompassed in a separate guide device. For example, for one base turbine housing-depending on application-use may be made of different, for example differently configured, guide devices, which in particular have different orientations of the guide blades. Conversely, it would also be possible for a particular design of a guide device to be integrated or used in different turbine housings. Thus, the present invention allows an improvement in exchangeability and reusability of the guide devices.

In refinements of the turbine arrangement, the guide device may be formed as a separate component. In particular, the guide device may be formed as a component which is separate from the turbine housing. Alternatively or in addition, the guide device may be formed as a component which is separate from a bearing housing of the supercharging device. In this way, the modularity of the turbine arrangement can be improved.

In refinements of the turbine arrangement that are combinable with the refinement above, the guide device may be inserted into the turbine housing. In particular, the guide device may be inserted in an exchangeable and/or removable and/or releasable manner into the turbine housing. In this way, a turbine arrangement can be provided which is flexibly adaptable to different uses or operating conditions.

In refinements of the turbine arrangement that are combinable with any of the refinements above, the guide device may be formed as a single piece. "Formed as a single piece" may mean that the elements of the guide device are connected to one another by cohesive bonding. The single-piece form may be produced for example by means of a primary forming process, in particular a casting process, by means of a joining process, in particular a fusion joining process such as for example a welding process or a brazing process, or by means of an additive process such as selective laser melting or laser material deposition. Additionally, deforming processes and/or material removal processes may have been used in order to attain the final design. By means of the single-piece form, it is possible on the one hand for the stability and the strength characteristics of the guide device to be improved. On the other hand, the assembly process can be simplified in this way.

In refinements of the turbine arrangement that are combinable with any of the refinements above, the carrier ring may be centered in the turbine housing, in particular by the turbine housing. Additionally, the carrier ring may be inserted in an axial direction into a recess of the turbine housing. In particular, the recess may be an annular recess. In refinements, the recess may be a groove, in particular an annular groove. Alternatively or in addition, the recess, in particular the annular recess, may be recessed into the turbine housing in an axial direction. The annular recess may be arranged in the region of the inflow channel. Alternatively or in addition, the recess, in particular the annular recess, may be recessed into a wall of the turbine housing in an axial direction, which wall is arranged between the turbine spiral and the turbine wheel and is oriented substantially in an axial direction toward a bearing housing of the supercharging device.

In refinements of the turbine arrangement that are combinable with the refinement above, the carrier ring may comprise a first ring element and a second ring element. The first ring element and the second ring element may be axially spaced apart from one another. The guide blades may be arranged between the first ring element and the second ring element. Alternatively or in addition, the second ring element may be inserted into the recess, in particular into the annular recess, such that only the guide blades are situated in the inflow channel. Alternatively or in addition, the inflow channel may at least partially be formed axially between the first ring element and the second ring element. Alternatively or in addition, the first ring element may be arranged at the bearing housing side (axially) adjacent to the guide blades. Alternatively or in addition, the second ring element may be arranged at the turbine housing side (axially) adjacent to the guide blades.

In refinements of the turbine arrangement that are combinable with any of the refinements above, the carrier ring may be centered on a centering surface, in particular a cylindrical centering surface, of the turbine housing. In particular, the carrier ring may be centered on a radially inwardly directed cylindrical centering surface. Additionally, the carrier ring may comprise at least one first ring element. Additionally, the guide blades may be arranged on the first ring element at the turbine housing side in an axial direction. Alternatively or in addition, the carrier ring may be centered, by way of an outer circumference of the first ring element, on an inner circumference of the centering surface. Alternatively or in addition, the turbine housing may comprise one or more axial compensation recesses which are designed for providing space for a thermal expansion of the guide blades in an axial direction. In particular, the one or more axial compensation recesses may be an annular recess. In refinements, the one or more axial compensation recesses may be a groove, in particular an annular groove. Alternatively or in addition, the one or more axial compensation recesses, in particular the annular axial compensation recess, may be recessed into the turbine housing in an axial direction. The one or more axial compensation recesses may be arranged in the region of the inflow channel. Alternatively or in addition, the one or more axial compensation recesses, in particular the annular axial compensation recess, may be recessed into a wall of the turbine housing in an axial direction, which wall is arranged between the turbine spiral and the turbine wheel and is oriented substantially in an axial direction toward a bearing housing of the supercharging device. As an alternative to the one annular axial compensation recess or the one groove-like axial compensation recess, it is possible for multiple axial compensation recesses to be provided in the turbine housing, which multiple axial compensation recesses are arranged and formed so as to correspond to the number of guide blades and so as to be arranged in each case adjacent to a respective guide blade in an axial direction, such that the respective guide blade can thermally expand into the adjacent axial compensation recess.

In refinements of the turbine arrangement that are combinable with the refinement above, the carrier ring may be screwed by way of an external thread on the outer circumference of the first ring element to the turbine housing by way of an internal thread on the inner circumference of the centering surface. By means of this advantageous design, both centering and axial securing or bracing of the guide device in the turbine housing can be provided. Additional securing elements, for example a spring element, are possible but are not necessary.

In refinements of the turbine arrangement that are combinable with any of the refinements above, the carrier ring may be configured to be centered in a bearing housing of the supercharging device by means of a plug-in connection. In particular, the carrier ring may be configured to be centered in a bearing housing of the supercharging device by means of multiple bolts distributed in a circumferential direction. The carrier ring may additionally have multiple axial bores distributed in a circumferential direction. The axial bores may be arranged and designed to be coupled or connected to the bearing housing by means of bolts.

In refinements of the turbine arrangement that are combinable with any of the refinements above, the turbine arrangement may furthermore comprise a heat shield. The heat shield may be arranged at the bearing housing side axially adjacent to the turbine wheel. The heat shield may additionally be of annular form. Alternatively or in addition, the carrier ring may be centered on the heat shield. Alternatively or in addition, the carrier ring may comprise at least one first ring element. The guide blades may be arranged on the first ring element at the turbine housing side in an axial direction. An inner circumference of the first ring element may lie against an outer circumference of the heat shield. Simple but effective centering of the guide device can be implemented in this way.

In refinements of the turbine arrangement that are combinable with any of the refinements above, the turbine arrangement may furthermore comprise a spring element. The spring element may be arranged at the bearing housing side axially adjacent to the carrier ring. Additionally, the spring element may be designed to brace the guide device in an axial direction against the turbine housing. In the refinements in which the turbine arrangement comprises a heat shield, the spring element may be arranged at the bearing housing side axially adjacent to the heat shield. That is to say, the heat shield may be arranged axially between the carrier ring and the spring element. Additionally, the spring element may brace the guide device or the carrier ring against the turbine housing via the heat shield.

In refinements of the turbine arrangement that are combinable with the refinement above, the spring element may be in the form of a disk spring. Additionally, the carrier ring may be centered on the spring element. Alternatively or in addition, the carrier ring may comprise at least one first ring element, in particular only the first ring element. The guide blades may be arranged on the first ring element at the turbine housing side in an axial direction. An inner circumference of the first ring element may be centered on an outer circumference of the spring element. In this way, simple centering and axial bracing can be made possible with only one element.

In refinements of the turbine arrangement that are combinable with any of the refinements above, the guide blades may project as far as a short distance in front of the turbine wheel. In particular, the guide blades may project as far as the radially inner end of the inflow channel.

In refinements of the turbine arrangement that are combinable with any of the refinements above, the guide device may comprise three to thirty, in particular three to fifteen, preferably four to twelve and particularly preferably five to ten guide blades. In some refinements, the guide device may comprise six to fifteen, preferably six to nine guide blades and particularly preferably six to eight guide blades.

In refinements of the turbine arrangement that are combinable with any of the refinements above, the fixed guide blades may be fixed to the carrier ring in the predetermined orientation such that said guide blades guide fluids onto the turbine wheel in an inflow direction at an angle $\alpha$ relative to the circumferential direction. The angle $\alpha$ may lie in a range between 100° to 175°. In particular, the angle $\alpha$ may lie in a range between 100° to 170° or 110° to 160°, preferably 120° to 150° and particularly preferably 130° to 140°. In some refinements, it may be particularly advantageous if the angle $\alpha$ lies in a range between 145° to 175°, preferably 150° to 170°, and particularly preferably 155° to 165°. It may furthermore be particularly advantageous if the guide blades are arranged and formed in such a predetermined orientation that an inflow angle into the turbine wheel lies between 150° to 170°. Alternatively or in addition, the guide blades may be arranged and formed so as to generate an incident angle of the exhaust gas onto the turbine wheel which is ideal for a desired operating point.

In refinements of the turbine arrangement that are combinable with any of the refinements above, the carrier ring may comprise a first ring element and a second ring element. The first ring element and the second ring element may be axially spaced apart from one another. The guide blades may be arranged between the first ring element and the second ring element. Alternatively or in addition, the inflow channel may at least partially be formed axially between the first ring element and the second ring element. Alternatively or in addition, the first ring element may be arranged at the bearing housing side (axially) adjacent to the guide blades. Alternatively or in addition, the second ring element may be arranged at the turbine housing side (axially) adjacent to the guide blades. Alternatively or in addition, the guide blades may extend radially inwardly proceeding from the ring elements. The guide blades may in particular extend as far as the radially inner end of the inflow channel.

In refinements of the turbine arrangement that are combinable with the refinement above and in which the turbine arrangement comprises the heat shield, the heat shield may have a channel section in a radially outer end region. Additionally, a bearing housing side of the inflow channel radially within the second ring element may be formed at least partially by the channel section. Alternatively or in addition, in some refinements, the bearing housing side of the inflow channel radially within the second ring element may be formed entirely by the channel section.

In refinements of the turbine arrangement that are combinable with the refinement above and in which the turbine arrangement comprises the spring element, the heat shield may be arranged axially between the spring element and the guide device. Additionally, the spring element may be configured to brace the guide device in an axial direction against the turbine housing via the channel section.

In refinements of the turbine arrangement that are combinable with either of the two preceding refinements, the channel section may have a U-shaped cross section with a radially outer limb and a radially inner limb. Additionally, an inner circumference of the first ring element may lie against an outer circumference of the radially outer limb of the U-shaped cross section.

In refinements of the turbine arrangement that are combinable with the refinement above and in which the turbine arrangement comprises the spring element, the heat shield may be arranged axially between the spring element and the guide device. Additionally, the spring element may project with a radially outer end region at the bearing housing side into the U-shaped cross section in order to thus brace the guide device in an axial direction against the turbine housing via the channel section.

In refinements of the turbine arrangement that are combinable with any of the refinements above, the guide device may be formed as a single piece. In particular, the guide device may be formed as a single piece as a sheet-metal part.

In refinements of the turbine arrangement that are combinable with any of the refinements above, the guide device may be formed as a sheet-metal part. In particular, the guide device may be formed from one sheet-metal part.

In refinements of the turbine arrangement that are combinable with any of the refinements above and in which the turbine housing comprises the recess, the carrier ring may comprise a first ring element and a second ring element. The first ring element and the second ring element may be axially spaced apart from one another. The guide blades may be arranged between the first ring element and the second ring element. Alternatively or in addition, the second ring element may be inserted into the recess, in particular into the annular recess, such that only the guide blades are situated in the inflow channel. Additionally, the first ring element and the second ring element may extend radially within and radially outside the guide blades so as to form a major part of the inflow channel. Alternatively or in addition, in some refinements, the first ring element and the second ring element may extend radially within and radially outside the guide blades so as to form substantially the entire inflow channel.

In refinements of the turbine arrangement that are combinable with the refinement above, the first ring element may be formed so as to form at least a major part of a first channel surface of the inflow channel. Alternatively or in addition, the second ring element may be formed so as to form at least a major part of a second channel surface, which is situated axially opposite the first channel surface, of the inflow channel.

In embodiments of the turbine arrangement that are combinable with either of the two embodiments above, the first ring element and the second ring element may be formed so as to form a radially inwardly tapering inflow channel.

In refinements of the turbine arrangement that are combinable with any of the three refinements above, the first ring element and the second ring element may be formed so as to form an inflow channel, the profile of which has an axial and a radial component.

In refinements of the turbine arrangement that are combinable with any of the refinements above and in which the turbine housing comprises the recess, the carrier ring may comprise a first ring element and a second ring element. The first ring element and the second ring element may be axially spaced apart from one another. The guide blades may be arranged between the first ring element and the second ring element. Alternatively or in addition, the second ring element may be inserted into the recess, in particular into the annular recess, such that only the guide blades are situated in the inflow channel. Alternatively or in addition, the turbine spiral may comprise a first volute and a second volute. The first volute and the second volute may be separated from one another in terms of flow by a partition. Additionally, the carrier ring may furthermore comprise a third ring element. Additionally, the third ring element may be arranged and formed axially between the first ring element and the second ring element so as to run as an elongation of the partition into the inflow channel, in particular through the inflow channel.

In refinements of the turbine arrangement that are combinable with the refinement above, the third ring element may extend from the partition as far as a radially inner end of the inflow channel, such that the inflow channel is separated into two axially adjacent inflow channel sections.

In refinements of the turbine arrangement that are combinable with any of the refinements above, the carrier ring may be screwed into the turbine housing. Additionally, the carrier ring may be centered on a centering surface, in particular a cylindrical centering surface, of the turbine housing. In particular, the carrier ring may be centered on a radially inwardly directed cylindrical centering surface. Additionally, the carrier ring may comprise at least one first ring element. Optionally, the carrier ring may comprise only the first ring element. Alternatively or in addition, the guide blades may be arranged on the first ring element at the turbine housing side in an axial direction. Alternatively or in addition, the carrier ring may be centered, by way of an outer circumference of the first ring element, on an inner circumference of the centering surface. Alternatively or in addition, the carrier ring may be screwed by way of an external thread on the outer circumference of the first ring element to the turbine housing by way of an internal thread on the inner circumference of the centering surface. Alternatively or in addition, the carrier ring may have an encircling bevel on a turbine-housing-side edge on the outer circumference of the first ring element. Precise and stable positioning of the guide device can be achieved by means of the centering by way of the outer circumference. The assembly process can furthermore be simplified. By means of the screw connection, the assembly process can likewise be simplified. Furthermore, costs can be reduced because axial bracing by means of an additional spring element is not necessary, though this is possible. By means of the bevel, turbulent flows in the inflow channel can be prevented or at least reduced.

In refinements of the turbine arrangement that are combinable with any of the refinements above, the guide device may be formed as a single piece. In particular, the guide device may be formed from one cast part. Alternatively, the guide device may be formed by a welded assembly. This yields advantages such as higher strength and for example greater robustness with respect to external forces, in particular axial forces and deformations. Furthermore, owing to the single-piece form, the assembly process can be simplified.

In refinements of the turbine arrangement that are combinable with any of the refinements above, the carrier ring may be a part from a previously known design, in particular from a previously known VTG design. Alternatively or in addition, the guide blades may be parts from previously known designs, in particular from previously known VTG designs. Additionally, the carrier ring of the best-suited (known) VTG turbine with regard to its size, blade width and/or hole circle may be selected. In this way, the outlay on development, in particular the development time and costs, can be reduced. For example, a cost saving can be achieved through the use of existing designs or through the use of inexpensive mass-produced parts. Furthermore, tried and tested previously known designs can be used, which can lead to an increase in the reliability of the turbine arrangement.

In refinements of the turbine arrangement that are combinable with the refinement above, the carrier ring and the guide blades may be formed as originally separate components. Additionally, the carrier ring and the guide blades may be connected to one another by joining, in particular cohesively. For example, the carrier ring and the guide blades may be formed as originally separate components and welded together. By virtue of the guide blades originally being provided separately, the guide blades can be better (re-)worked by cutting. This leads to a facilitation of a production process. Alternatively or in addition, guide blades may be connected, in particular welded or brazed, in the predetermined orientation to the carrier ring. Alternatively or in addition, the guide blades may be VTG guide blades. Additionally, the guide blades may each have a journal. Additionally, the guide blades may, by way of the respective journals, be inserted into and rigidly fastened, in particular welded, in corresponding bores of the carrier ring in the predetermined orientation. Alternatively, the guide blades may, by way of the respective journals, be pressed into and rigidly fastened, in particular welded, in corresponding bores of the carrier ring in the predetermined orientation.

In refinements of the turbine arrangement that are combinable with any of the refinements above, the turbine arrangement may be designed for use in a dual-volute turbine. The turbine spiral may comprise a first volute and a second volute. The first volute and the second volute may open into the guide device in a manner separated in terms of flow between a first turbine housing tongue and a second turbine housing tongue. Additionally, two of the multiple guide blades may be formed as tongue guide blades. The tongue guide blades may be arranged adjacent to the turbine housing tongues. The guide device may be arranged and formed in the turbine housing such that in each case one of the tongue guide blades is arranged as an elongation of in each case one of the turbine housing tongues, such that a separation of the volutes in terms of flow is continued in the guide device. A radially inner end of the respective turbine housing tongue may be arranged substantially flush with a radially outer end of the respective tongue blade.

In refinements of the turbine arrangement that are combinable with any of the refinements above, the turbine arrangement may furthermore comprise a rotation-preventing securing means. The rotation-preventing securing means is designed to substantially prevent a rotation of the guide device in a circumferential direction. The rotation-preventing securing means may be formed by a pocket and a pin which engages radially into the pocket. In refinements, the pocket may be recessed into a radially inwardly directed cylindrical centering surface of the turbine housing. The pin may be arranged and formed on the carrier ring (210) such that the pin engages radially outwardly into the pocket from an outer circumference of the carrier ring.

The present invention furthermore relates to a supercharging device. The supercharging device comprises a compressor arrangement, a bearing housing, a shaft and a turbine arrangement according to any of the refinements above. The compressor arrangement comprises a compressor housing and a compressor wheel which is arranged rotatably in the compressor housing. The shaft is arranged rotatably in the bearing housing. The turbine wheel is rotatably coupled to the compressor wheel via the shaft.

In refinements of the supercharging device in which the turbine arrangement comprises a spring element, the bearing housing may have an axial projection at a turbine-side end region. The axial projection may be configured such that the spring element is mounted thereon. Alternatively or in addition, in refinements in which the turbine arrangement comprises a heat shield, the bearing housing may have an axial projection at a turbine-side end region, which projection is configured for bearing the heat shield. In refinements in which the turbine arrangement comprises a spring element and a heat shield, the axial projection may have a stepped formation in order to provide separate bearing surfaces for the spring element and the heat shield.

In refinements of the supercharging device that are combinable with the refinement above, the carrier ring may be centered in the bearing housing by means of a plug-in connection. In particular, the carrier ring may be centered in the bearing housing by means of multiple bolts distributed in a circumferential direction.

In refinements of the supercharging device that are combinable with either of the two refinements above and in which the carrier ring is screwed into the turbine housing, the heat shield may be flange-mounted between the turbine housing and the bearing housing.

BRIEF DESCRIPTION OF THE FIGURES

FIG. 4A-4C show various detail views of the guide device from FIG. 3;

DETAILED DESCRIPTION

Figure 1:
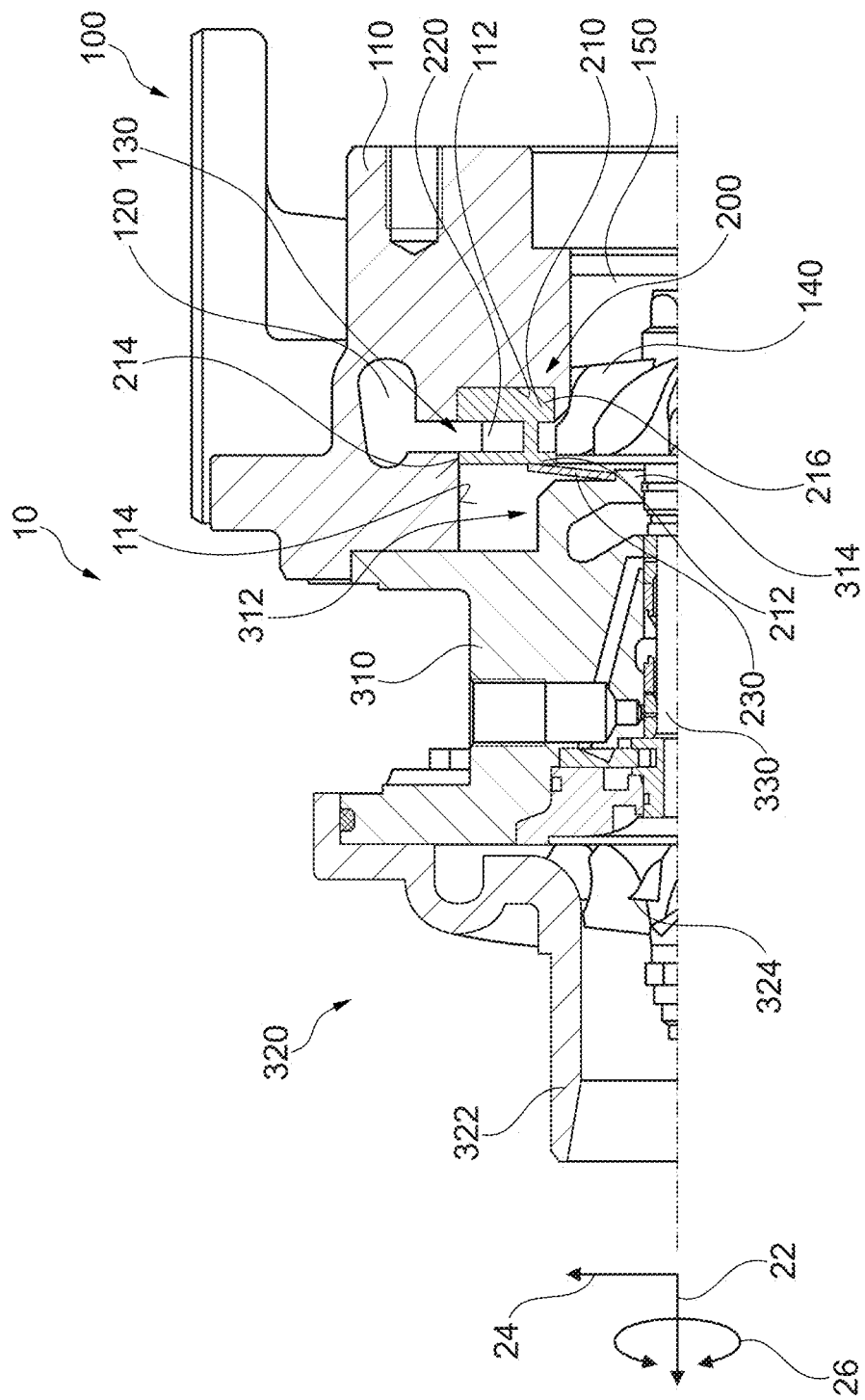
FIG. 1 shows a detail of an exemplary supercharging device with the turbine arrangement and with a schematically illustrated guide device in a sectional side view.

In the context of this application, the expressions "axial" and "axial direction" relate to an axis of rotation of the turbine arrangement 100 or of the turbine wheel 140 and/or of the guide device 200 or of the carrier ring 220. With regard to the figures (see for example FIG. 1, FIG. 3, FIG. 4C or FIG. 5A), the axial direction of the turbine arrangement/guide device is illustrated by the reference designation 22. A radial direction 24 relates here to the axis/axial direction 22 of the turbine arrangement/guide device. Likewise, a circumference or a circumferential direction 26 relates here to the axis/axial direction 22 of the turbine arrangement/guide device.

FIG. 1 shows an exemplary supercharging device 10 which comprises a turbine arrangement 100 with a guide device 200. The illustration in FIG. 1 shows merely a detail of the supercharging device 10 as far as a line of symmetry along an axis of the supercharging device 10 (or along an axis of a shaft 330 of the supercharging device 10). Aside from the turbine arrangement 100, the supercharging device 10 comprises a compressor arrangement 320, a bearing housing 310 and a shaft 330, which is arranged rotatably in the bearing housing 310. The compressor arrangement 320 comprises a compressor housing 322 and a compressor wheel 324 which is arranged rotatably in the compressor housing 322. Aside from the guide device 200, the turbine arrangement 100 comprises a turbine housing 110 which defines a turbine spiral 120 and a turbine outlet 150. Furthermore, the turbine arrangement 100 comprises a turbine wheel 140 which is arranged in the turbine housing 110 between the turbine spiral 120 and the turbine outlet 150. An inflow channel 130 is formed between the turbine spiral 120 and the turbine wheel 140. In some embodiments, the inflow channel 130 may be formed at least partially by the guide device 200 (see the explanations further below). The inflow channel 130 is formed by a first channel surface 134 and an oppositely situated second channel surface 136 (reference designations not shown in FIG. 1, but see for example FIG. 9). The first channel surface 134 is arranged at the bearing side of the inflow channel 130. The second channel surface 136 is arranged at the turbine side of the inflow channel 130. The inflow channel 130 runs from the turbine spiral 120 substantially radially inward to the turbine wheel 140 (in the case of a semiaxial turbine, inflow channel 130 runs radially inward and axially away from the bearing housing 310). More specifically, the inflow channel 130 runs from a radially outer end (no reference designation) to a radially inner end 132. The radially outer end of the inflow channel 130 is to be understood to mean the region in which fluids enter the inflow channel 130 from the turbine spiral 120. The distance between the radially outer end and radially inner end 132 may also be referred to as an overall length of the inflow channel 130. Through the inflow channel 130, fluids can be guided from the turbine spiral 120 onto the turbine wheel 140 and can flow onward out of the turbine housing 110 through the turbine outlet 150. The turbine wheel 140 is coupled rotatably to the compressor wheel 324 via the shaft 330. That is to say, the turbine wheel 140 is arranged, in particular fixed, on a first end of the shaft 330. The compressor wheel 324 is arranged, in particular fixed, on a second end of the shaft 330. The first end may also be referred to as turbine-side end or turbine-housing-side end. The second end may also be referred to as compressor-side end or compressor-housing-side end. The first end is situated opposite the second end.

Basically, in the context of this application, the expressions "turbine-housing-side", "compressor-housing-side" and "bearing-housing-side" are to be understood as expressions for axial sides, axial positions or axial directions relative to other components. In particular, for example in FIG. 1, "turbine-housing-side" refers to a position which is further to the right in relation to another position. For example, in FIG. 1, "bearing-housing-side" refers to a position which is further to the left in relation to another position. Here, the expressions "turbine-housing-side", "compressor-housing-side" and "bearing-housing-side" may be used as synonyms for the respective expressions "turbine-side", "compressor-side" and "bearing-side". These explanations are also applicable in a figurative sense to the other figures.

Figure 3:
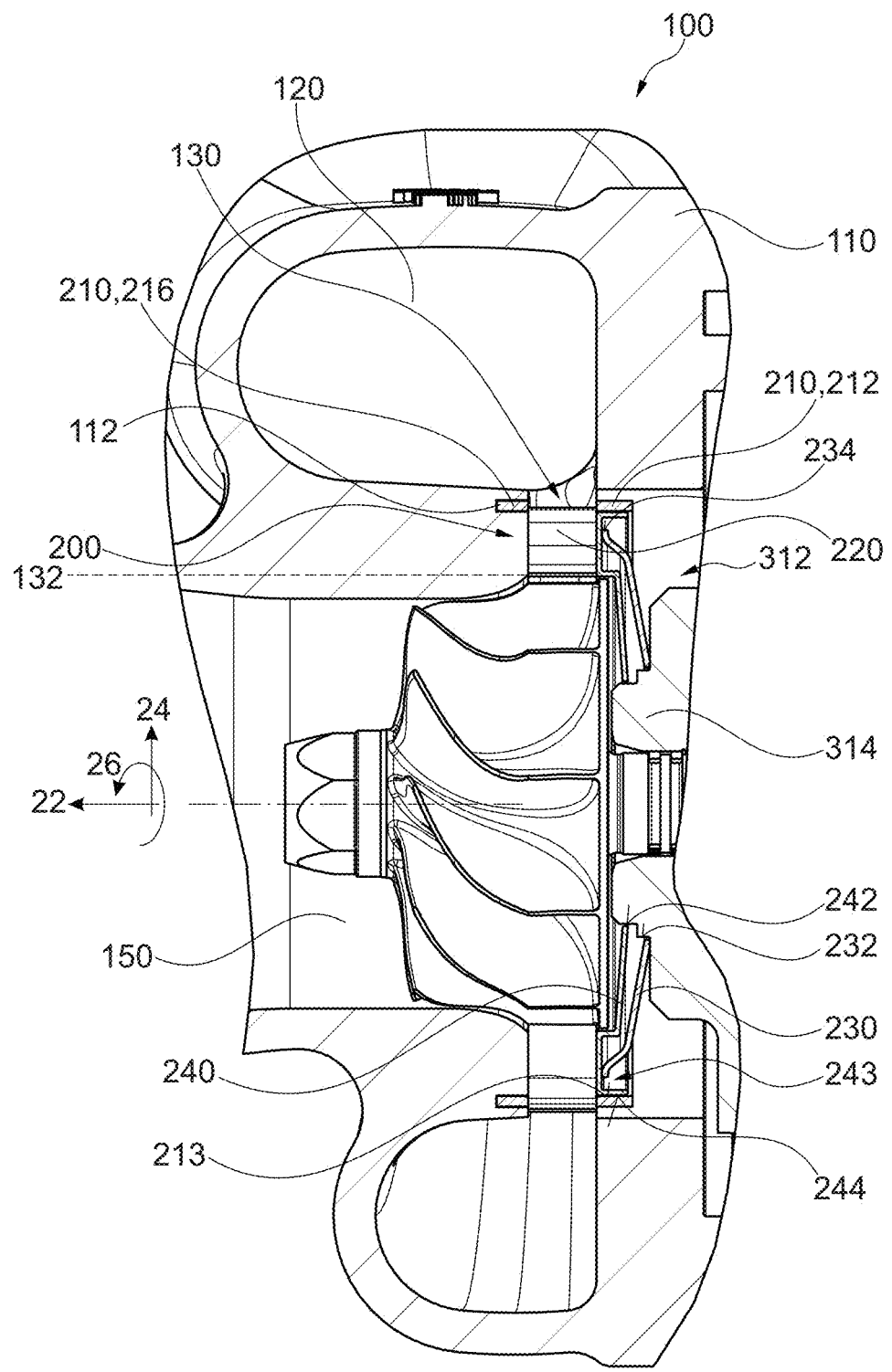
FIG. 3 shows the turbine arrangement with a first guide device of exemplary design, which is centered on two sides.

As can also be seen in FIG. 1, the bearing housing 310 comprises a flange (turbine-side flange) and a turbine-side end region 312. The flange is formed in the radially outer region on the bearing housing 310 and serves for fastening the turbine housing 110, or a flange of the turbine housing 110, to the bearing housing 310. The turbine-side end region 312 is arranged in a radially inner region. Alternatively, the turbine-side end region 312 may also be referred to as turbine-side housing end region. The turbine-side end region 312 is of cylindrical form and surrounds the shaft 330. As can be seen in FIG. 1, the turbine-side end region 312 has an axial projection 314. The axial projection extends from an end surface on the turbine-side end region 312 in an axial direction 22 to the turbine wheel 140. In the example shown, the axial projection 314 is configured to support a spring element 230 of the turbine arrangement 200. For this purpose, the axial projection 314 is of stepped form, such that the spring element 230 is supported on a radially inner region. In other words, the spring element 230 can be mounted on the axial projection 314. The radially inner region of the spring element 230 may also be referred to as inner circumference 232 (not illustrated in FIG. 1, but see for example FIG. 3). In other embodiments, a heat shield 240 may also be mounted or supported on the axial projection 314. More specifically, a radially inner region of the heat shield 240, in particular an inner circumference 242 of the heat shield 240, may be supported or mounted (not illustrated in FIG. 1, but see for example FIG. 3). In some embodiments, the axial projection 314 may also be configured to support or to bear the spring element 230 and the heat shield 240. For this purpose, the axial projection 314 may for example be of doubly stepped form as shown in FIG. 3. In other words, the axial projection may, for this purpose, have a stepped shoulder. It is thus possible for two different support regions or delimitations for the spring element 230 and the heat shield 240 to be provided (see also FIGS. 3, 5A, 6A, 7A, 8A and 9). In alternative embodiments, the spring element 230 and the heat shield 240 may also be mounted or supported on one step (not illustrated). The axial projection 314 may also be referred to as annular projection which extends coaxially around the shaft 330 (or around the axis of the shaft 330). The axial projection 314 can thus also serve for the centering, and/or as a counter bearing, of the spring element 230 and/or of the heat shield 240. It is self-evident that the bearing housing 310 or the turbine-side end region 312 thereof is formed so as to brace the spring element 230 axially in the direction of the turbine housing 110. For example, the spring element 230 may be arranged so as to lie against an axially oriented surface of the end region 312, from which the axial projection 314 is elevated in the direction of the turbine housing 110.

As already mentioned, the turbine arrangement 100 comprises a guide device 200 which is arranged in the turbine housing 110 between the turbine spiral 120 and the turbine wheel 140 (see FIG. 1). The guide device 200 is formed as a component separate from the turbine housing 110 and from the bearing housing 310 and is inserted into the turbine housing 110. More specifically, the guide device 200 is arranged in the inflow channel 130 between the turbine spiral 120 and the turbine wheel 140. That is to say, the guide device 200 is inserted exchangeably or releasably into the turbine housing 110. If required, it would be possible for the guide device 200 to be removed again and for example exchanged for a different guide device 200. In this way, a turbine arrangement 100 can be provided which is flexibly adaptable to different uses or operating conditions.

Figure 10A:
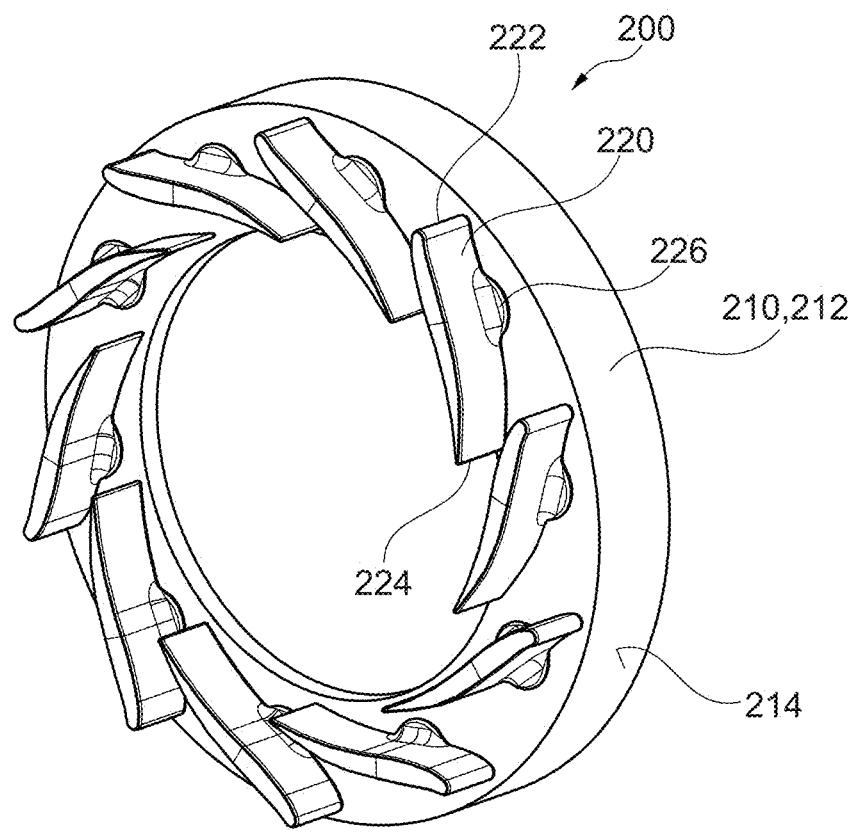
FIGS. 10A-10B show various detail views of the guide device from FIG. 9.

The guide device 200 comprises a carrier ring 210 and multiple guide blades 220 (see for example FIGS. 1 and 10A). The guide blades 220 are arranged on the carrier ring 210 fixedly in a predetermined orientation. The guide device 200 is arranged in the turbine housing 110 such that, during the operation of the supercharging device 10 or of the turbine arrangement 100, fluids can be conducted from the turbine spiral 120 through the inflow channel 130 over the guide blades 220 onto the turbine wheel 140. In other words, the guide device 200 is arranged in the turbine housing 110 such that fluids can be conducted from the turbine spiral 120 through the guide device 200 or along the guide device 200 over the guide blades 220 onto the turbine wheel 140. This is possible because, depending on the refinement, the guide device 200 forms the inflow channel 130 in its entirety or at least partially. The predetermined orientation is to be understood to mean an orientation which deviates from an orientation in a circumferential direction 26 toward a more radial or more tangential orientation (see FIG. 2A). In this way, fluids passing from the turbine spiral 120 can be guided more radially or tangentially onto the turbine wheel 140. In other words, the guide device 200 is arranged such that the guide blades 220 can guide a flow from the turbine spiral 120 onto the turbine wheel 140 correspondingly to the predetermined orientation. Assembly and cost advantages arise as a result of the fact that the guide blades 220 are not integrally connected to the turbine housing 110 but are part of the separate guide device 220. For example, for one base turbine housing, depending on application, use may be made of different, for example differently configured, guide devices 200, which in particular have different orientations of the guide blades 220. Conversely, it would also be possible for a particular design of a guide device 200 to be integrated or used in different turbine housings 110. Thus, the present invention allows an improvement in exchangeability and reusability of the guide devices 200 or of the turbine housing 110.

The fixed arrangement of the guide blades 220 is to be understood to mean that the guide blades 220 are not adjustable. In particular, this is to be understood to mean that the guide blades 220 are not rotatable, as in the case of VTG guide blades, but are rigid or fixed. In other words, the guide blades 220 may also be referred to as fixed guide blades 220. That is to say, the guide blades 220 are arranged in a fixed orientation relative to the carrier ring 210. In other words, the guide blades 220 are arranged in a fixed orientation relative to the circumferential direction 26 (see in particular FIG. 2A). In order to illustrate and more precisely specify the predetermined orientation, use may be made here of the angle α at which the guide blades 220 are arranged relative to the circumferential direction 26 (see FIG. 2B). That is to say, the guide blades 220 are fixed to the carrier ring 210 at the angle α relative to the circumferential direction 26. In other words, the angle α describes a diversion of the flow from a first flow direction along the circumferential direction 26 into a second flow direction (also referred to as modified direction) along the guide blades 220. More specifically, the second flow direction runs along a side surface, oriented toward the turbine wheel 140, of the respective guide blades 220. The second flow direction may also be referred to as inflow direction 223. The angle α is thus formed between the circumferential direction 26 (or a tangent along the circumferential direction 26) and the inflow direction 223. Depending on the shape of the guide blades 220 (for example running in a curved or straight manner), the inflow direction 223 may for example correspond to a connecting line between leading edge 222 and trailing edge 224 of a guide blade 220, for example in the case of guide blades 220 running in a straight manner with a substantially constant width. That is to say, in such cases, the predetermined orientation corresponds to the inflow direction 223 at the angle α. In refinements in which the guide blades 220 have a curved profile and/or have a varying width between leading edge 222 and trailing edge 224, the predetermined orientation does not correspond to the inflow direction 223 at the angle α. In this case, the predetermined orientation (that is to say the arrangement of the guide blades 220 on the carrier ring 210) must be selected such that the fluids can be guided as desired at the angle α along the inflow direction 223 onto the turbine wheel 140. In other words, the fixed guide blades 220 are designed to divert an exhaust-gas flow within the turbine housing 110 from a first flow direction 26 into a second flow direction 223 which lies at an angle α relative to the first flow direction 26. That is to say, the guide blades 220 are arranged and formed so as to generate an incident angle of fluids onto the turbine wheel 140 which is ideal for a desired operating point.

Figure 2A:
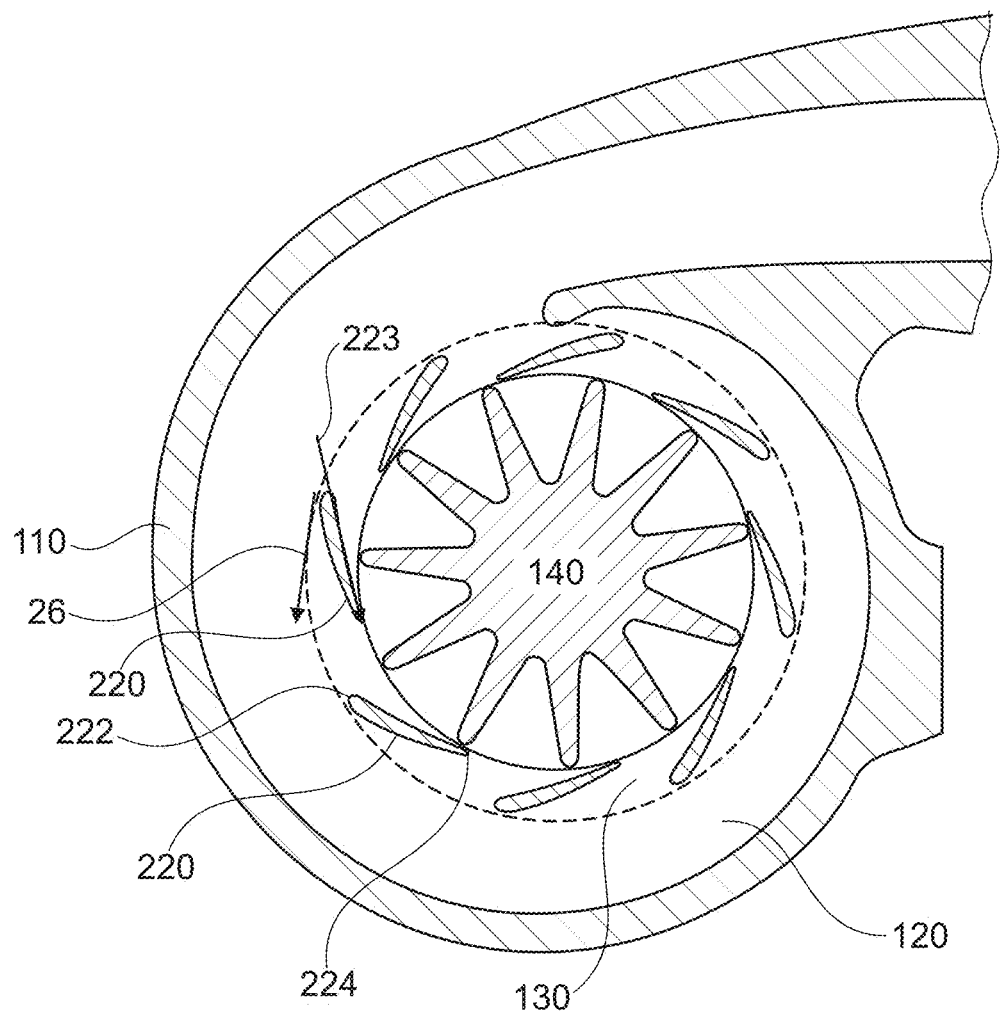
FIGS. 2A-2B show a sectional view through the turbine housing with the guide blades arranged in the predetermined orientation.
Figure 2B:
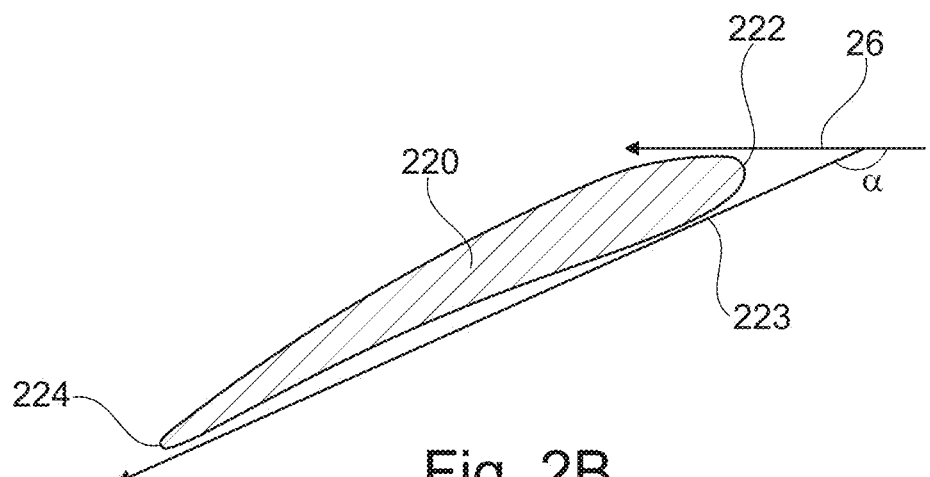

In the example of FIG. 2B, the guide blades 220 are arranged in such a predetermined orientation that they generate an inflow direction 223 of approximately α=155°. This is however to be regarded merely as an exemplary refinement. The angle α may lie in a range between 100° to 175°. In particular, the angle α may lie in a range between 100° to 170° or 110° to 160°, preferably 120° to 150° and particularly preferably 130° to 140°. In some refinements, it may be particularly advantageous if the angle α lies in a range between 145° to 175°, preferably 150° to 170°, and particularly preferably 155° to 165°. It may furthermore be particularly advantageous if the guide blades 220 are arranged and formed in such a predetermined orientation that an inflow angle into the turbine wheel 140 lies between 150° to 170°. Basically, the angle α that is optimum for the turbine arrangement 100 may vary for example in a manner dependent on the construction of the turbine wheel 140 and of the turbine spiral 120 and on the engine operating conditions of an engine for which the supercharging device 10 is provided. Each guide blade 220 may be oriented at the same angle α, or one or more of the guide blades 220 may be oriented at a different angle α, wherein some guide blades 220 provide a relatively intense redirection of exhaust gas, and other guide blades 220 provide a lesser redirection. Here, the pitch, that is to say the spacing in a circumferential direction 26, between the guide blades 220 may also vary. With these measures (angle α and/or pitch not constant for all guide blades 220), the excitation of the turbine can be influenced, and thus the service life can be lengthened with regard to fatigue damage (in particular HCF damage).

As can be seen in FIG. 2A, the guide blades 220 project as far as a short distance in front of the turbine wheel 140. That is to say, the trailing edges 224 of the respective guide blades 220 are arranged a short distance in front of the turbine wheel 140 in a radial direction 24. In this regard, FIG. 3 shows that the guide blades 220 project as far as the radially inner end 132 of the inflow channel 130. In other words, the trailing edges 224 of the respective guide blades 220 are arranged at the radially inner end 132 of the inflow channel 130. In some refinements, it is also possible that individual or several guide blades 220 do not project all the way to the radially inner end 132 of the inflow channel 130. The extent of the guide blades 220 as far as a short distance in front of the turbine wheel leads to good flow guidance at the desired inflow angle 223. In order to allow a reliable diversion of flow onto the turbine wheel 140, the guide blades 220 should project at least as far as 50% of the overall length of the inflow channel 130 in front of the radially inner end 132 of the inflow channel 130, preferably at least as far as 30% of the overall length of the inflow channel 130 in front of the radially inner end 132 of the inflow channel 130, and particularly preferably at least as far as 10% of the overall length of the inflow channel 130 in front of the radially inner end 132 of the inflow channel 130. For example, the guide blades 220 may project with different lengths or equal lengths radially inward in the inflow channel 130. In some refinements, the guide blades 220, or the trailing edges 224 thereof, may be arranged at the same radially inner positions (for example on one circle which is concentric with respect to the axis 22). Lengths of the guide blades 220 (between leading edge 222 and trailing edge 224) may in this case be of equal or different lengths. The same applies to the further dimensions of the guide blades 220, such as for example width or curvature of the guide blades 220.

FIG. 2A furthermore shows that the guide device 200 comprises eight guide blades 220. The guide device 200 may however basically also comprise some other number of guide blades 220. The number of guide blades 220 may for example vary in a manner dependent on the size of the guide blades 220, on how closely they are spaced (pitch), and in a manner dependent on the manner of production. The size, number, spacing and pitch of the guide blades 220 may be varied for specific applications (with correspondingly different optimal operating points). Accordingly, the guide device 200 may comprise three to thirty, in particular three to fifteen, preferably four to twelve or particularly preferably five to ten guide blades 220. In some refinements, the guide device 200 may comprise six to fifteen, preferably six to nine guide blades 220 and particularly preferably six to eight guide blades 220. Further details regarding orientation and design of fixed guide blades are known for example from DE112015000631T5.

The turbine wheel 140 operates in a high-temperature environment and may be exposed to gas temperatures of up to 1922° F. (1050° C.). Furthermore, the turbine wheel 140 rotates at very high speeds. The rotational speed of a turbine wheel is dependent on its size, and relatively small turbine wheels can rotate at higher speeds than relatively large wheels. A small turbine wheel for a supercharging device 10 that is used in conjunction with an internal combustion engine may reach rotational speeds of up to 350,000 rpm. The rapid rotation of the turbine wheel 140 generates intense centrifugal forces or centrifugal load on the turbine wheel 140. Accordingly, it is necessary to prevent the turbine wheel 140 from rotating at higher speeds than those specified by the design limits. The energy imparted to the turbine wheel 140 by the exhaust gas varies with the angle at which the exhaust gas is guided. For a radial flow turbine wheel, the exhaust gas delivered to the turbine wheel 140 varies with the angle at which the gas is incident on the turbine wheel. For a radial flow turbine wheel, the maximum energy is provided if the exhaust gas is incident radially or tangentially on the turbine wheel. In some cases, guiding the full force of the exhaust gas onto the turbine wheel could have the effect, however, that the turbine wheel rotates at higher speeds than desired, and thus generates too high a boost pressure. The fixed guide blades 220 in the inflow channel 130 can be set (by means of a corresponding predetermined orientation and optionally by means of a correspondingly curved design) such that they generate an incident angle of the exhaust gas onto the turbine wheel 140 which is ideal for a desired operating point. In some embodiments, the supercharging device 10 may also comprise a wastegate (not illustrated) in order to release exhaust-gas pressure if required. For example, the wastegate may be arranged in a bypass passage which connects the turbine spiral 120 directly to the turbine outlet 150 and which bypasses the turbine wheel 140. The turbine arrangement 100 may be used in a supercharging device 10 for a gasoline or diesel engine in applications where the costs and complexity of a supercharging device 10 with movable blades (for example VTG blades) are not desirable. In some embodiments, the fixed guide blades 220 may be set at an angle or at angles which fall(s) into the range of blade angles that are used by a turbocharger with movable blades. The turbine arrangement 100 may also be used in a supercharging device 10 for applications with fixed engine rotational speeds, for example electrical generators. In these applications, the engine is operated with a constant rotational speed and a relatively constant load. The guide blades 220 of the guide device 200 may be arranged and formed at such a predetermined orientation in order to generate an inflow direction 223 at an angle α which is optimum for engine rotational speeds and load.

The guide device 200 comprises the carrier ring 210 with the guide blades 220. The carrier ring 210 may, depending on refinement, comprise a different number of ring elements 212, 216, 218. At the least, the carrier ring 210 always comprises a first ring element 212 to which the guide blades 220 are fastened (see for example FIG. 10A and FIG. 11A, FIG. 12A and FIG. 13A). In other words, the guide blades 220 are arranged at the turbine housing side on the first ring element 212. In other words, the guide blades 220 are arranged in the turbine housing 110 on the first ring element 212. In some refinements, the carrier ring 210 may also, in addition to the first ring element 212, comprise a second ring element 216 (see for example FIG. 1, FIG. 4A and FIG. 5A). In a number of further refinements, the carrier ring 210 may, in addition to the first ring element 212 and the second ring element 216, comprise a third ring element 218 (see for example FIG. 8A). The first ring element 212 is arranged at the bearing housing side of the inflow channel 130 and may form at least a part of the first channel surface 134 of the inflow channel 130 (see for example FIG. 5A). The second ring element 216 is arranged at the turbine side of the inflow channel 130 and may form at least a part of the second channel surface 136 of the inflow channel 130 (see for example FIG. 5A). In other words, the first ring element 212 is arranged at the bearing housing side axially adjacent to the guide blades 220 and, if present, the second ring element 216 is arranged at the turbine housing side axially adjacent to the guide blades 220. The first ring element 212 and the second ring element 216 are axially spaced apart from one another. The guide blades 220 are arranged axially between the first ring element 212 and the second ring element 216. In other words, the guide blades 220 are fastened or fixed axially between the first ring element 212 and the second ring element 216. In particular, the guide blades are connected in single-piece form to both ring elements 212, 216. The inflow channel 130 is at least partially formed axially between the first ring element 212 and the second ring element 216. In other words, the inflow channel 130 runs axially between the first ring element 212 and the second ring element 216. In refinements in which the carrier ring 210 comprises only the first ring element 212, the inflow channel 130 is formed between the first ring element 212 and the turbine housing 110. This means that the guide blades 220 are arranged in the inflow channel 130. It is thus possible for fluids, in particular exhaust gases, that flow through the inflow channel 130 to be influenced in terms of their flow direction by the guide blades 220. If a third ring element 218 is present, this is arranged axially between the first ring element 212 and the second ring element 216 (see for example FIG. 8A). In an alternative embodiment which is not illustrated and in which the carrier ring 210 comprises only the first ring element 212, it would also be possible for the first ring element 212 to be arranged at the turbine side of the inflow channel 130, and for the guide blades 220 to be fastened at the bearing housing side to the first ring element 212. In this example which is not illustrated, it would then be possible for a further element, for example the heat shield 240 or a part of the bearing housing 310, to form at least a part of the first channel surface 134.

The expression "carrier ring 210" is basically to be understood to mean an annular element which holds the guide blades 220 in a fixed orientation relative to one another and relative to the carrier ring 210 itself and which may comprise multiple sections (for example first, second, third ring element 212, 216, 218). In refinements with only a first ring element 212, the carrier ring 210 corresponds for example to the first ring element 212 (see for example FIG. 10A or FIG. 11B). The expression "ring element" can be understood to mean a substantially annular body, in particular a closed ring or a ring with one or more recesses. The ring element is to be understood as an annular body which is suitable for holding the guide blades 220 in a fixed position in the predetermined orientation. In particular, a ring element is to be understood as being such that it, like for example the first ring element 212 from FIG. 4C, defines an outer circumference 214 and inner circumference 213 running in a circumferential direction 26.

As can be seen in particular in FIG. 1 (see also all of the other figures), the guide device 200 is formed as a single piece. In this context, "formed as a single piece" means that the elements of the guide device 200 are connected to one another by cohesive bonding. The single-piece form may be produced for example by means of a primary forming process, in particular a casting process, by means of a joining process, in particular a fusion joining process such as for example a welding process or a brazing process, or by means of an additive process such as selective laser melting or laser material deposition, or by MIM (metal injection molding). Additionally, deforming processes and/or material removal processes may have been used in order to attain the final design. By means of the single-piece form, it is possible on the one hand for the stability and the strength characteristics of the guide device 200 to be improved. On the other hand, the assembly process can be simplified in this way. In some refinements, the guide device 200 may also be formed integrally from one part, which is to be understood as encompassing at least the abovementioned primary forming processes and additive processes (see for example FIG. 1, FIG. 3, FIG. 5A). By contrast, an originally separate provision of the carrier ring 210 and of the guide blades 220 and the subsequent cohesive connection, for example connection by fusion joining, of carrier ring 210 and guide blades 220 would not be integral provision from one part (see for example FIGS. 9, 10A, 10B). In alternative embodiments (which are not illustrated here), connection by joining by means of screws, bolts or the like would also be conceivable. This would however have disadvantages with regard to strength and stability, but advantages such as the possibility of the separate mechanical machining of the details before the assembly process.

Depending on the refinement of the guide device 200, various forms of centering and bracing of the guide device 200 in the turbine housing 110 may be provided, which will be discussed below on the basis of specific exemplary refinements as per FIGS. 3, 4A to 4C, 5A and 5B, 6A and 6B, 7A and 7B, 8A and 8B, 9, 10A, 10B, 11A and 11B, 12A and 12B, 13A and 13B and which are combinable with the general features discussed above. These explanatory explanations are however intended to be understood not as limiting but as combinable. For example, centering may be implemented on one side or two sides. In all refinements that comprise at least one first ring element 212, centering of the guide device 200 by means of the first ring element 212 may be implemented. This may comprise one or more of the following centering arrangements: centering by means of a centering surface 114 of the turbine housing 110, centering by means of a screw connection on a centering surface 114 of the turbine housing 110, centering by means of a plug-in connection 316 to the bearing housing 310, centering by means of the heat shield 240, and/or centering by means of the spring element 230. In refinements that furthermore comprise a second ring element 216, centering of the guide device 200 may be implemented on two sides. That is to say, centering of the guide device 200 may also (alternatively or additionally) be implemented by means of the second ring element 216. For this purpose, in the turbine housing 110, there may be provided a recess 112 into which the second ring element 216 is inserted. The axial bracing may be implemented by means of the spring element 230, which braces the guide device 200, directly or via the heat shield 230, in the axial direction 22 from the bearing housing side to the turbine side. As described above, the bearing housing 310 may serve as axial counter bearing for the spring element 230 when the turbine arrangement 100 and the bearing housing 310 have been assembled. Alternatively or in addition, the axial bracing may be implemented by means of a screw connection of the first ring element 212 to the centering surface 114 of the turbine housing 110. Basically, the guide device 200 is arranged so as to be secured against rotation in the turbine housing 110, for example by way of the axial bracing. In some embodiments, an additional rotation-preventing securing means 318 may be provided, which will be discussed by way of example on the basis of FIGS. 13A and 13B. The details of the centering, of the axial bracing and of the rotation-preventing securing means will be discussed below on the basis of the individual embodiments one to nine. Even if details of particular elements of the turbine arrangement are discussed only in conjunction with one particular embodiment or figure, individual or several of these details are however also transferable to other embodiments or non-illustrated refinements.

In this regard, FIGS. 3 and 4A to 4C show the turbine arrangement 100 with the guide device 200 in a first exemplary embodiment. The guide device 200 of this first exemplary embodiment is formed as a single piece as a sheet-metal part. In other words, the guide device 200 is formed from one sheet-metal part. Here, proceeding for example from an originally flat and rectangular sheet-metal part, u-shaped cuts can be made in a central strip, and the sheet-metal part can then be deformed into a ring shape and the material region of the u-shaped cuts bent radially inward. It is thus possible for the carrier ring 210 with the first ring element 212, the second ring element 216 and the guide blades 220 situated in between to be provided (see FIGS. 4A to 4C). By way of the form as a sheet-metal part, material and weight can be saved, and cost advantages are attained.

As can be seen in particular in FIG. 3, the first ring element 212 and the second ring element 216 are axially spaced apart from one another. The guide blades 220 are arranged between the first ring element 212 and the second ring element 216. The first ring element 212 is arranged at the bearing housing side axially adjacent to the guide blades 220 and the second ring element 216 is arranged at the turbine housing side axially adjacent to the guide blades 220. The guide blades 220 extend from the ring elements 212, 216 radially inward to the radially inner end 132 of the inflow channel 130. The guide device 200 comprises nine guide blades 220, though in other refinements may also comprise a greater or lesser number of guide blades 220. In a refinement as a sheet-metal part, the number of guide blades 220 should be selected in accordance with the geometry of the turbine arrangement 100 such that the guide blades 220, on the one hand, project no further than the radially inner end 132 of the inflow channel 130. On the other hand, the number should be selected such that the guide blades 220 project radially far enough inward to allow a reliable diversion of flow onto the turbine wheel 140.

In the first exemplary embodiment, the guide device 200 is centered on two sides (see FIG. 3). More specifically, the guide device 200 is centered on two axially opposite sides. In other words, the guide device 200 is centered at the turbine side and at the bearing housing side. More specifically, the carrier ring 210 is centered at the turbine side and at the bearing housing side, or the first ring element 212 thereof is centered at the bearing housing side and the second ring element 216 thereof is centered at the turbine side. Here, the carrier ring 210 or the second ring element 216 is inserted in an axial direction 22 into a recess 112 of the turbine housing 110. The recess 112 is an annular recess 112. More specifically, the recess 112 is an annular groove which is configured such that it can receive the second ring element 216. By means of the groove-like recess, the second ring element 216 can be centered at its radially outer circumference and its radially inner circumference in the groove. In alternative embodiments, it would however also be possible for the recess 112 to be designed so as to center the second ring element 216 only at a radially inner circumference of the second ring element 216 or at a radially outer circumference of the second ring element 216. The recess 112 is recessed in an axial direction into the turbine housing 110 such that the second ring element 216 terminates flush with the second channel surface 136 of the inflow channel 130. It is thus possible for turbulent flows to be reduced in relation to a ring element that would protrude into the inflow channel 130. This means that the recess 112 is arranged in the region of the inflow channel 130 and is recessed into a wall of the turbine housing 110 in an axial direction 22, which wall is arranged between the turbine spiral 120 and the turbine wheel 140 and is oriented substantially in an axial direction 22 toward a bearing housing 310 of the supercharging device 10 (see FIG. 3). By virtue of the fact that the second ring element 216 is inserted flush into the recess 112, only the guide blades 220 are situated in the inflow channel 130. The fact that only the guide blades 220 are situated in the inflow channel 130 means, in other words, that the first and the second ring element 212, 216 are not situated in the inflow channel 130. The axial height of the guide blades 220 is selected here such that the first ring element 212 is arranged outside the inflow channel 130 and terminates flush therewith. This means that the inflow channel 130 is at least partially formed axially between the first ring element 212 and the second ring element 216. In other words, the inflow channel 130 is formed at least partially by surfaces, which point toward one another in an axial direction 22, of the ring elements 212, 216. A surface, directed from the turbine side toward the bearing side, of the second ring element 216 may in this case form a part of the second channel surface 136. A surface, directed from the bearing side toward the turbine side, of the first ring element 212 may in this case form a part of the first channel surface 134. Even though the first and the second channel surface 134, 136 have not been denoted by reference designations in FIG. 3 for the sake of clarity, it is clear from the other figures (for example FIG. 5A) where said surfaces are located in FIG. 3. By means of the carrier ring 210 inserted into the recess 112, aside from the weight reduction and inexpensive production, the assembly process can be simplified, and stable and precise positioning can be achieved.

The turbine arrangement 100 of FIG. 3 furthermore comprises a heat shield 240 and a spring element 230. The bearing-housing-side centering of the guide device 200 is implemented here by means of the heat shield 240. Basically, the heat shield 240 is arranged at the bearing housing side axially adjacent to the turbine wheel 140 and is of annular design. Here, an inner circumference 213 of the first ring element 212 lies against an outer circumference 244 of the heat shield 240. In the example of FIG. 3, the heat shield 240 comprises a channel section 243 in a radially outer end region. The channel section 243 has a U-shaped cross section with a radially outer limb and a radially inner limb. The radially outer limb and the radially inner limb run in a substantially axial direction 22. In alternative embodiments, one or both of the limbs may however also run in an inclined manner relative to the axial direction 22. The channel section 243 is arranged such that its U-shaped cross section is open toward the bearing housing 310. The inner circumference 213 of the first ring element 212 lies against an outer circumference 244 of the radially outer limb of the U-shaped cross section. The guide device 200 or the carrier ring 210 can thus be centered. In other embodiments, it would also be possible for the guide device 200 to be centered by a heat shield 240 without the U-shaped cross section. For the centering, it is advantageous merely if the inner circumference 213 of the first ring element 212 can lie with centering action against an outer circumference 244 of the heat shield 240. Improved centering can however be achieved by means of the radially outer limb, running in a substantially axial direction 22, of the channel section 243. The channel section 243 is furthermore advantageous because it can serve as a delimitation of the inflow channel 130. In the refinement of FIG. 3, a bearing housing side of the inflow channel 130 radially within the second ring element 216 is formed by the channel section 243. More specifically, the first channel surface 134 (see 134 in the other figures, for example 5A) of the inflow channel 130 is at least partially formed by the channel section 243. This may also be achieved by means of a heat shield 243 without a U-shaped cross section. With regard to FIG. 3, it can be seen that the first channel surface 134 of the inflow channel 130 is, radially between the first ring element 212 and the turbine wheel 140 or the radially inner end 132 of the inflow channel 130, formed entirely by the channel section 243. In other words, the bearing housing side of the inflow channel 130 radially within the second ring element 216 is formed entirely by the channel section 243. In alternative embodiments, it would also be possible for the bearing-housing-side centering to be implemented between the outer circumference 214 of the first ring element and the centering surface 114 of the turbine housing 110. Simple but effective centering of the guide device in the turbine housing can be implemented in this way.

In alternative refinements, the guide device 100 of this first embodiment may also be centered only on one side. For example, the carrier ring 210 may be centered at the bearing housing side by means of the first ring element 212. In this case, the recess 112 may be dimensioned such that the second ring element 216 is centered neither at a radially inner circumference of the second ring element 216 nor at a radially outer circumference of the second ring element 216. Alternatively, the carrier ring 210 may be centered only at the turbine housing side by means of the second ring element 216.

The spring element 230 is arranged at the bearing housing side axially adjacent to the heat shield 240. That is to say, the heat shield 240 is arranged axially between the guide device 200 (or the guide blades 220) and the spring element 230. The spring element 230 braces the guide device 200 or the carrier ring 210 against the turbine housing 110 via the heat shield 240. More specifically, the force flow runs from the spring element 230 via the heat shield 240 to the guide blades 220 directly into the turbine housing 110 and/or via the second ring element 216 into the turbine housing 110. The spring element 230 is in the form of a disk spring. The spring element 230 projects with a radially outer end region at the bearing housing side into the U-shaped cross section of the channel section 243. The guide device 200 can thus be braced in an axial direction 22 against the turbine housing 110 via the channel section 243.

In alternative embodiments, the carrier ring 210 may be centered not on the heat shield 240 but on the spring element 230 (not illustrated). Here, an inner circumference 213 of the first ring element 212 may lie against an outer circumference 234 of the spring element 230. In this way, simple centering and axial bracing can be made possible with only one element.

FIGS. 5A, 6A, 7A and 8A show four further exemplary embodiments of the turbine arrangement 100. FIGS. 5B, 6B, 7B and 8B show detail views of the respectively associated specific refinements of the guide devices 200. These four embodiments have in common the fact that they likewise comprise a first and a second ring element 212, 216, are centered on two sides and are braced by means of the spring element 230. By contrast to the embodiment of FIG. 3, the guide devices of these embodiments are formed not as a sheet-metal part but as a single piece as a cast part. In alternative refinements, other single-piece forms would also be possible, for example by means of a fusion joining connection (in particular a welded assembly) or by means of an additive process. The guide devices 200 of FIGS. 5B, 6B, 7B and 8B are preferably formed from one cast part. This yields advantages such as higher strength and for example greater robustness with respect to external forces, in particular axial forces and deformations. Furthermore, owing to the single-piece form, the assembly process can be simplified. The formation as a cast apart furthermore yields good adaptability to different designs of the turbine spiral 120 and/or of the turbine wheel 140, 140a.

In the embodiments of FIGS. 5A, 6A, 7A and 8A, the turbine-side centering is realized, similarly to the case in the embodiment of FIG. 3, in that the second ring element 216 is inserted in an axial direction 22 into a recess 112 of the turbine housing 110. Here, the recess 112 is formed as an annular recess. The recess 112 is recessed in an axial direction 22 into the turbine housing 110 and is open toward the turbine spiral 120. More specifically, the recess 112 is recessed into a wall of the turbine housing 110 in an axial direction 22, which wall is arranged between the turbine spiral 120 and the turbine wheel 140 and is oriented substantially in an axial direction 22 toward the bearing housing 310 of the supercharging device 10. The recess 112 is arranged in the region of the inflow channel 130. Here, the second ring element 112 is designed such that, in a radially outer region, it forms a transition region, in particular a flush transition region, from the turbine spiral 120 to the inflow channel 130. In alternative refinements (analogous to FIG. 1), the recess 112 may however also be formed as a groove, in particular annular groove. In the latter case, depending on the refinement of the recess 112, the second ring element 216 could then be centered by way of a radially inner circumference of the second ring element 216 and/or by way of a radially outer circumference of the second ring element 216.

The second ring element 216 is inserted into the recess 112 such that only the guide blades 220 are situated in the inflow channel 130. That is to say, the inflow channel 130 is at least partially formed axially between the first ring element 212 and the second ring element 216. The first ring element 212 and the second ring element 216 extend radially within and radially outside the guide blades 220 such that they form substantially the entire inflow channel 130 (see FIGS. 5A, 6A, 7A and 8A). It can be seen in these figures that a small section of the second channel surface 136 radially between the second ring element 216 and the radially inner end 132 of the inflow channel 130 is not formed by the second ring element 216. This small section is necessary for the centering action. Alternatively, the recess 112 could also be formed such that the second ring element 216 forms the second channel surface 136 as far as the radially inner end 132 of the inflow channel, as long as a wall section, adjoining this, of the turbine housing 110, for example between the radially inner end 132 and an inner wall of the turbine housing 150, is provided as a centering surface. In alternative embodiments, the small section could however also be arranged in a radially outer region, such that the second ring element 216 would be centered not at a radially inner circumference but at a radially outer circumference. In such a refinement, the second ring element 216 could be formed such that it forms at least a part of a wall section between the radially inner end 132 and an inner wall of the turbine outlet 150. "Forming substantially the entire inflow channel 130" can be understood to mean that at least 75% of an overall length of the inflow channel 130 is formed by the ring elements 212, 216. In alternative refinements, the first ring element 212 and the second ring element 216 may also be arranged and formed (in particular extend radially within and radially outside the guide blades 220) such that they form only a major part of the inflow channel 130. A major part of the inflow channel 130 may be regarded for example as being at least 50%, preferably at least 60% and particularly preferably at least 70% of the overall length of the inflow channel 130. As already mentioned, the overall length may be regarded as being the region of the inflow channel 130 from an inlet of the turbine spiral 120 into the inflow channel 130 as far as the radially inner end 132 of the inflow channel 130. In some embodiments, it is also possible for the first ring element 212 to form substantially the entire first channel surface 134 or at least a major part of the first channel surface 134, and/or for the second ring element 216 to form substantially the entire second channel surface 136 or at least a major part of the second channel surface 136. "Forming substantially the entire first channel surface 134 or second channel surface 136" may be understood to mean that at least 75% of an overall length of the first channel surface 134 or of the second channel surface is formed by the respective ring elements 212, 216. A major part of the first channel surface 134 or of the second channel surface may be regarded for example as being at least 50%, preferably at least 60% and particularly preferably at least 70% of the overall length of the first channel surface 134 or of the second channel surface respectively.

In the embodiments of FIGS. 5A, 6A, 7A and 8A, the bearing-housing-side centering is performed by means of the plug-in connection 316 to the bearing housing 310. For this purpose, the carrier ring 210 is configured to be centered in a bearing housing 310 of the supercharging device 10 by means of one or more bolts distributed in a circumferential direction 26, in particular two or more bolts. More specifically, the first ring element 212 is configured to be centered in a bearing housing 310 of the supercharging device 10 by means of one or more bolts distributed in a circumferential direction 26. For this purpose, the first ring element 212 has one or more, in particular two or more, axial bores 215 which are distributed in a circumferential direction 26. Here, the axial bores 215 are arranged and designed to be connected to the bearing housing 310 by means of bolts. That is to say, the axial bores are recessed into an axial end surface, directed toward the bearing housing 310, of the first ring element 212. In alternative refinements, the bolts may also be integrally connected to the carrier ring 210 or to the bearing housing 310. In further alternative embodiments, use may also be made of other plug-in connections, in particular plug-in elements other than bolts.

In the embodiments of FIGS. 5A, 6A, 7A and 8A, the axial bracing is performed by means of the spring element 230. The turbine arrangements 100 of the embodiments of FIGS. 5A, 6A, 7A and 8A all comprise an optional heat shield 240, which is arranged at the bearing housing side axially adjacent to the turbine wheel 140 and is of annular design. The heat shield 240 lies with a radially outer region against a radially inner region of the first ring element 212. The radially outer region of the heat shield 240 is in this case arranged at the bearing housing side axially adjacent to the radially inner region of the first ring element 212, so as to make contact in an axial direction. Furthermore, the turbine arrangement 100 comprises the spring element 230, which is arranged at the bearing housing side axially adjacent to the heat shield 240. That is to say, the heat shield 240 is arranged axially between the guide device 200 (or first ring element 212, in particular radially inner region of the first ring element 212) and the spring element 230. The spring element 230 braces the guide device 200 or the carrier ring 210 against the turbine housing 110 via the heat shield 240. The spring element 230 is in the form of a disk spring. The spring element 230, by way of a radially outer end region, braces the radially outer region of the heat shield 240 against the radially inner region of the first ring element 212. The guide device 200 can thus be braced in an axial direction 22 against the turbine housing 110 via the heat shield 240.

In alternative embodiments, the carrier ring 210 may be centered not by means of the plug-in connection 316 but also by means of the heat shield 240 or the spring element 230 (not illustrated). Here, an inner circumference 213 of the first ring element 212 may lie against an outer circumference 244 of the heat shield 240 or against an outer circumference 234 of the spring element 230. Alternatively, the bearing-housing-side centering could also be realized by means of centering on the centering surface 114 of the turbine housing 110, against which an outer circumference 214 of the first ring element 212 lies. It would likewise then be possible for the axial bracing to also be realized by means of a screw connection of the carrier ring 210 in the turbine housing 110.

The four embodiments of FIGS. 5A, 6A, 7A and 8A differ in particular in the refinement of the turbine spiral 120 and of the inflow channel 130.

Figure 5A:
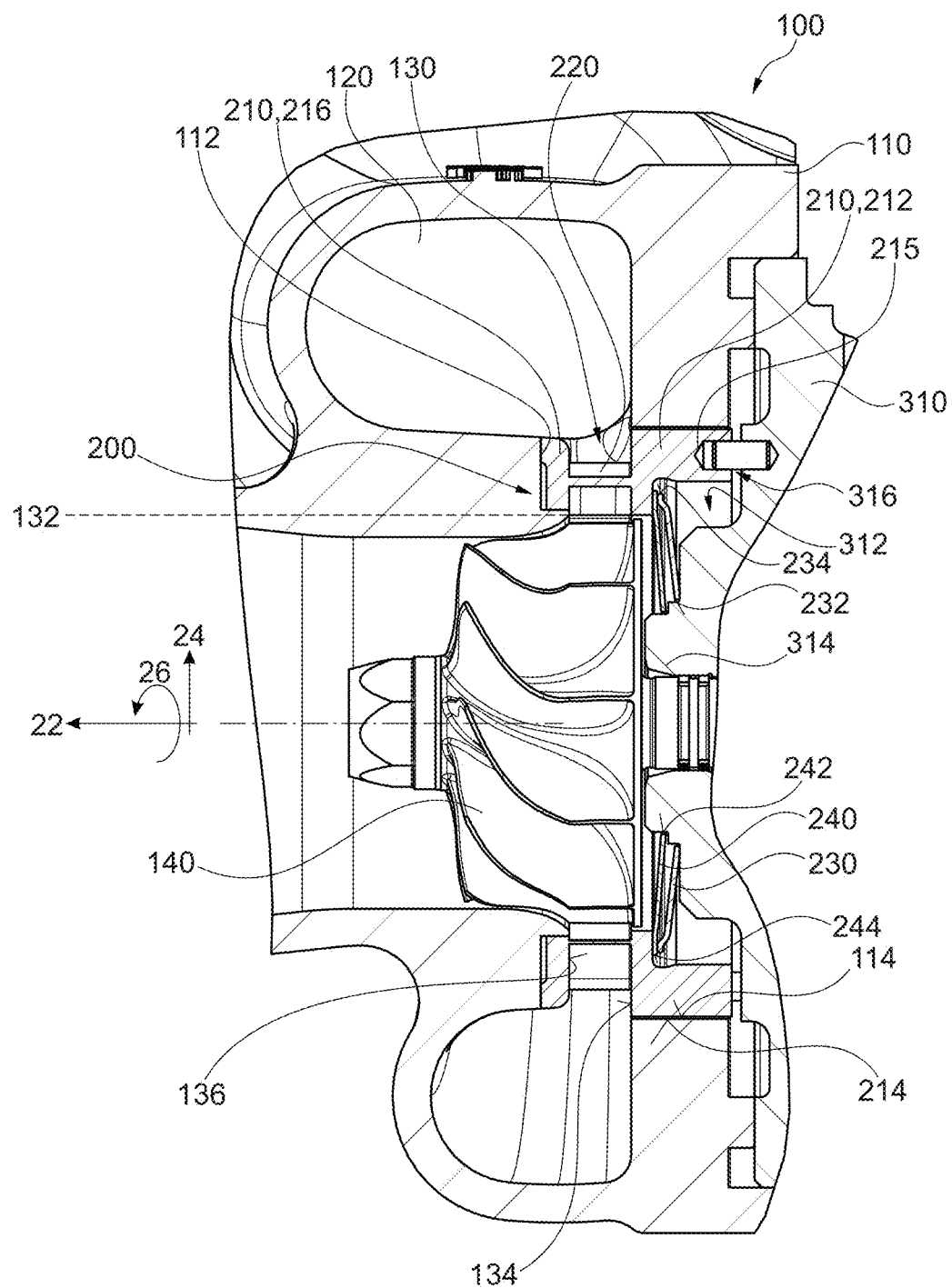
FIG. 5A shows the turbine arrangement with a second guide device of exemplary design, which is centered on two sides.
Figure 5B:
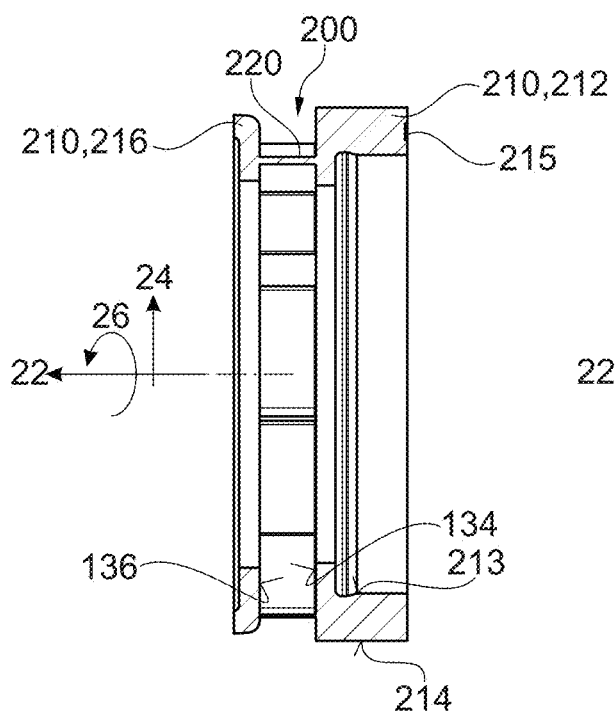
FIGS. 5B, 6B, 7B, 8B show detailed views of the respective guide devices from FIGS. 5A, 6A, 7A and 8A.

Accordingly, the second exemplary embodiment of the turbine arrangement 100 has an inflow channel 130 with a substantially constant width in an axial direction 22 (see FIGS. 5A and 5B). That is to say, the guide device 200 is configured to form an inflow channel 130 or at least a major part of the inflow channel 130, which has a substantially constant width in an axial direction 22. In other words, the first ring element 212 and the second ring element 216 are designed to form a substantially constant spacing between the first channel surface 134 and the second channel surface 136.

Figure 6B:
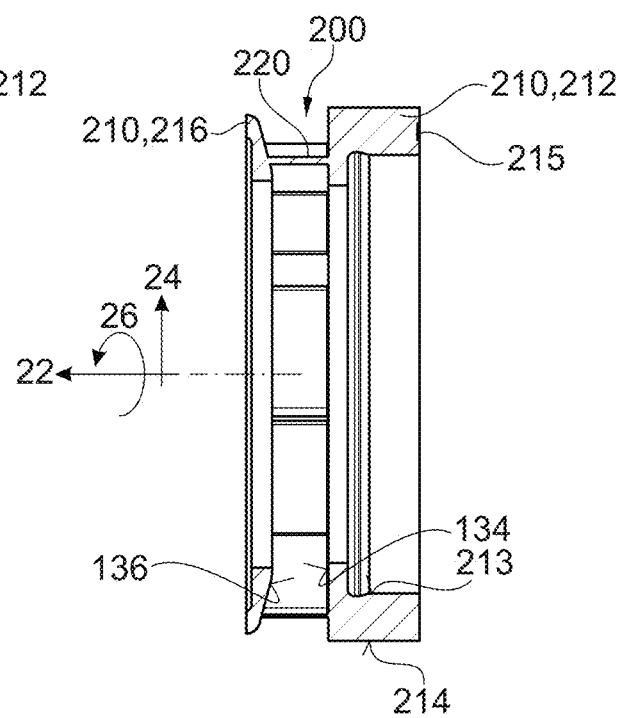
Figure 6A:
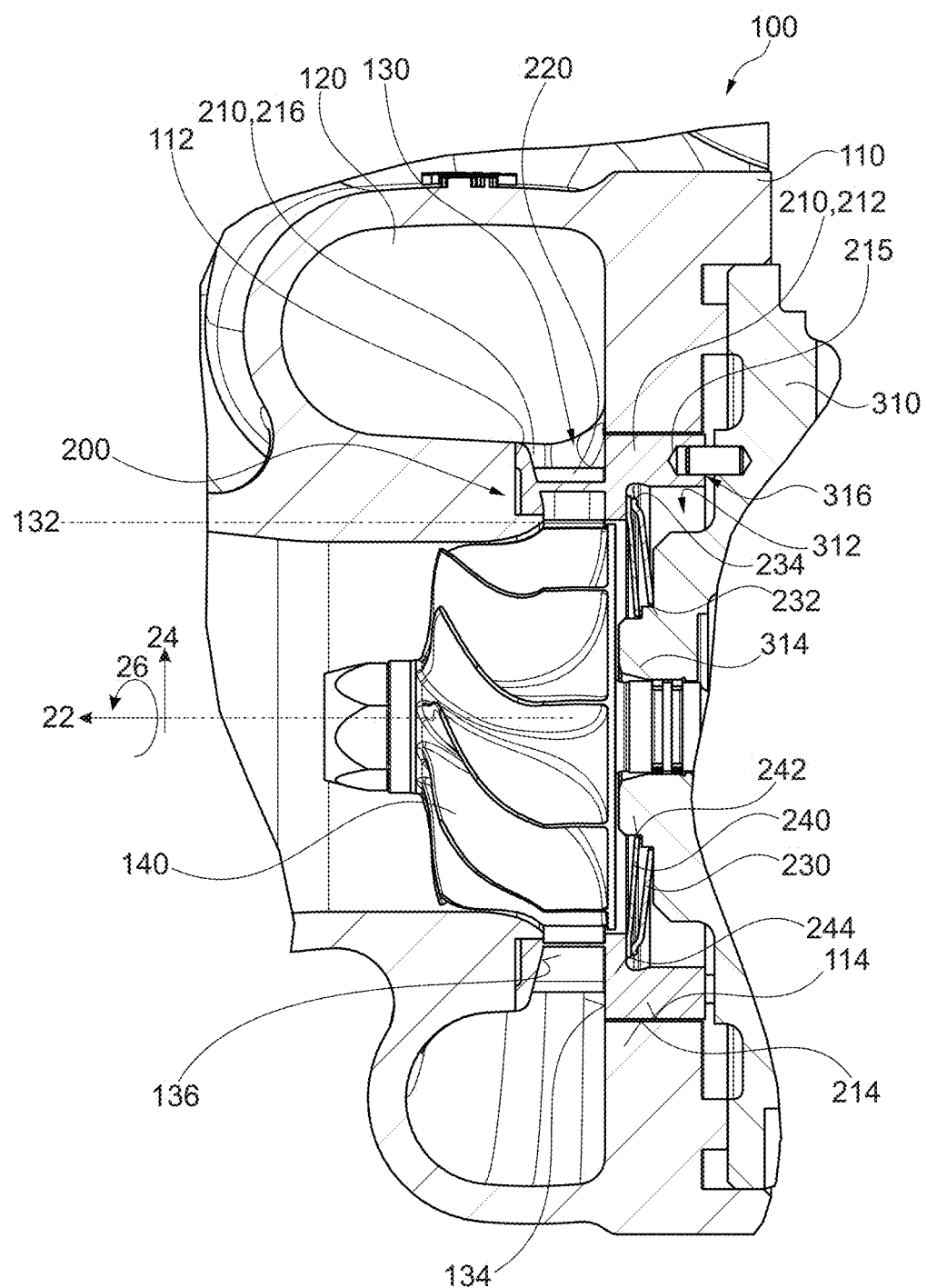
FIG. 6A shows the turbine arrangement with a third guide device of exemplary design, which is centered on two sides and which forms a tapering inflow channel.

The third exemplary embodiment of the turbine arrangement 100 has an inflow channel 130 with a width in an axial direction 22 which decreases in a radially inward direction (see FIGS. 6A and 6B). That is to say, the guide device 200 is configured to form an inflow channel 130 or at least a major part of the inflow channel 130, which has a width in an axial direction 22 which decreases in a radially inward direction. In other words, the first ring element 212 and the second ring element 216 are designed so as to form a radially inwardly tapering inflow channel 130 or a major part of the radially inwardly tapering inflow channel 130. In this context, "tapering" is to be understood to mean that an axial spacing between the two channel surfaces 212, 216 becomes shorter in a radial direction 24 toward the inside.

Figure 7B:
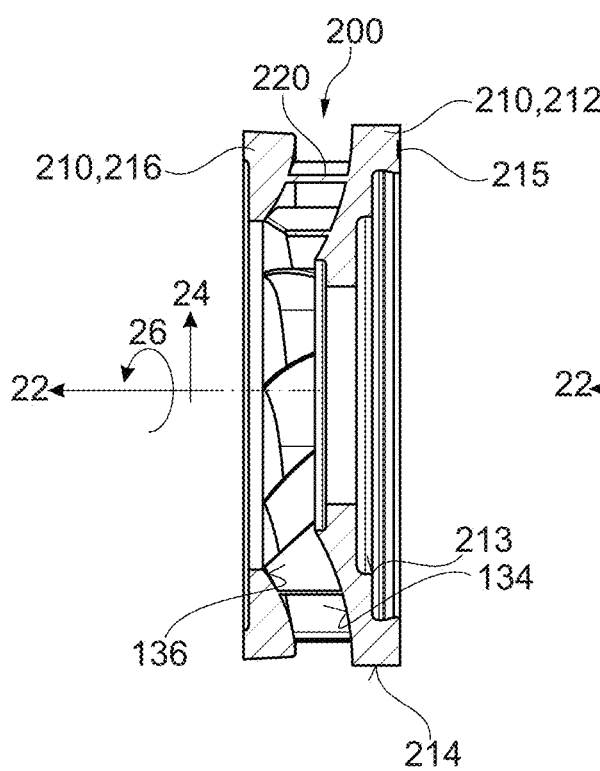
Figure 7A:
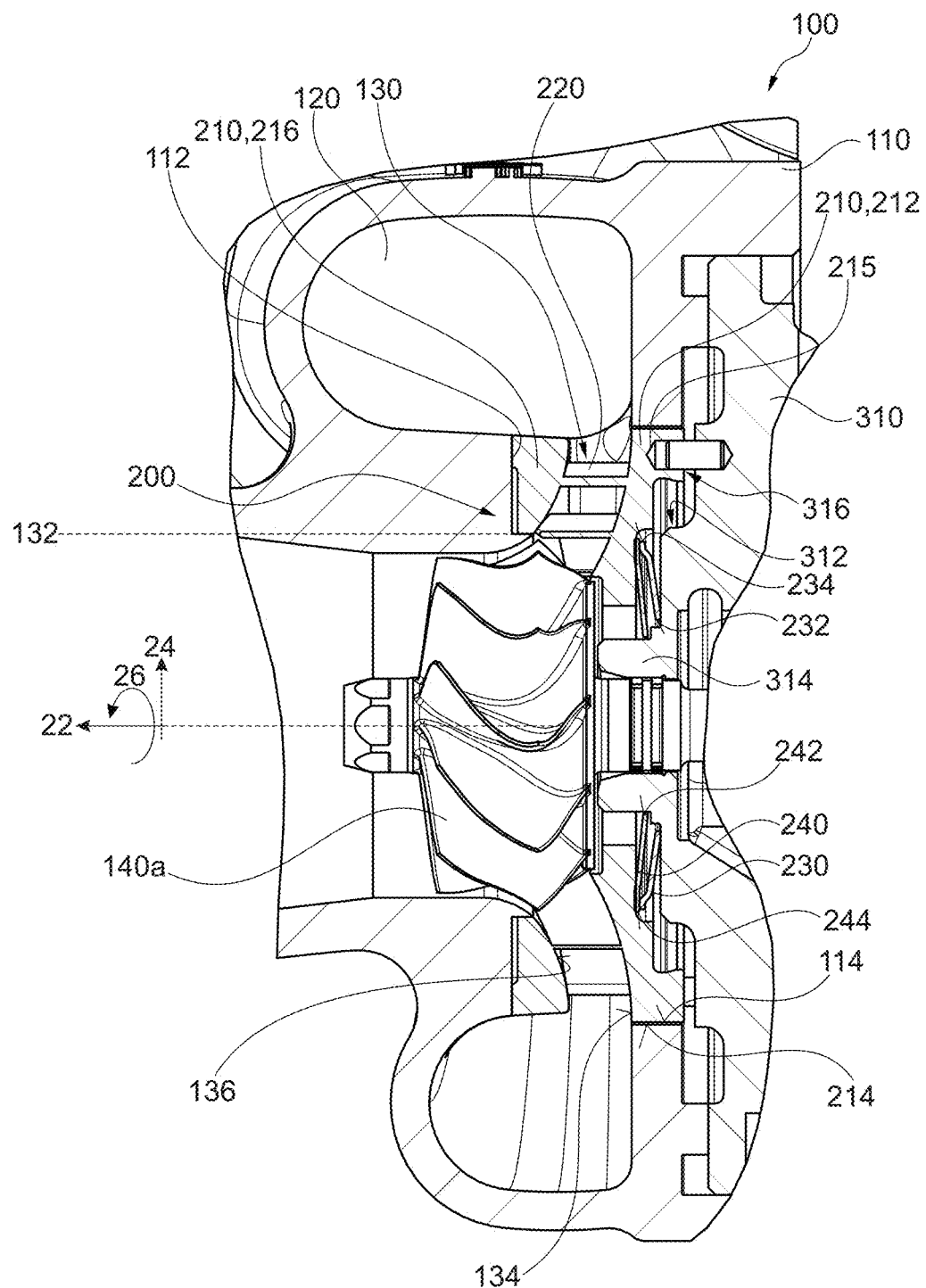
FIG. 7A shows the turbine arrangement with a fourth guide device of exemplary design, which is centered on two sides and which forms a semiaxial inflow channel.

The fourth exemplary embodiment of the turbine arrangement 100 has an inflow channel 130 with a profile in a radial direction 24 and an axial direction 22 (see FIGS. 7A and 7B). The turbine arrangement 100 of this fourth example is a mixed-flow turbine arrangement 100 (also referred to as semiaxial or semiradial turbine or turbine arrangement) and has a mixed-flow turbine wheel 140*a*. That is to say, the turbine wheel 140*a* is designed to be impinged on by flow in a direction which has an axial and a radial component. The guide device 200 is configured to form an inflow channel 130 or at least a major part of the inflow channel 130. In other words, the first ring element 212 and the second ring element 216 are designed so as to form first and second channel surfaces 134, 136 which extend in a curved profile from a radial direction 24 to a more axial direction 22. In other words, the first ring element 212 and the second ring element 216 are designed so as to form an inflow channel 130, the profile of which has an axial and a radial component.

Figure 8B:
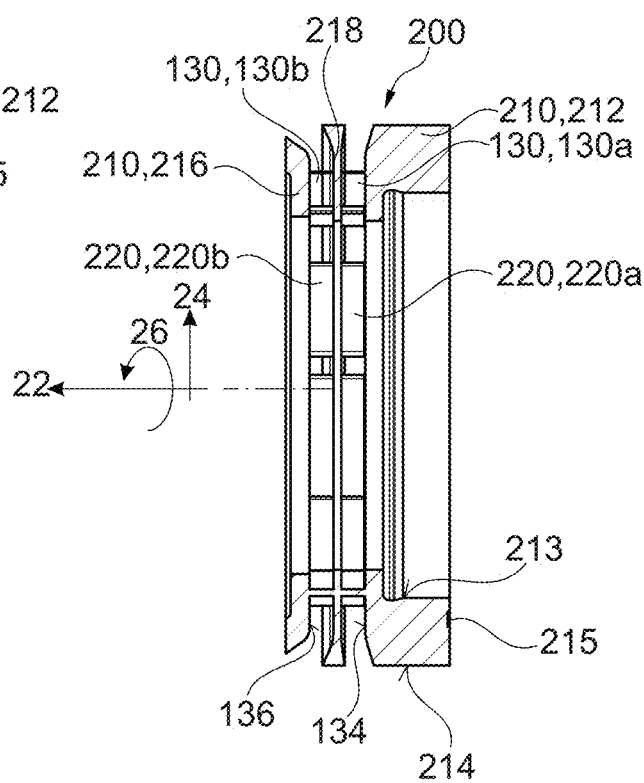
Figure 8A:
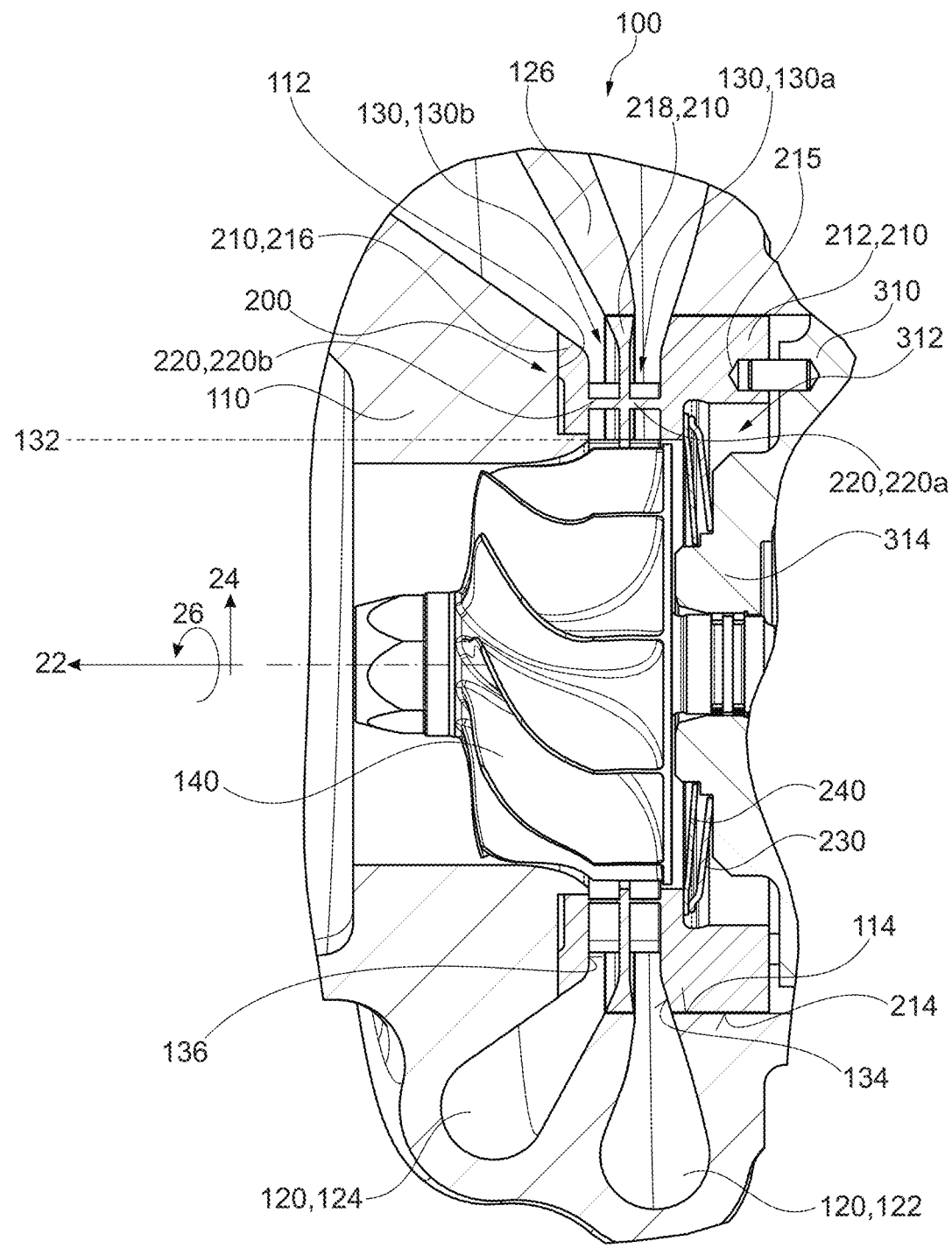
FIG. 8A shows the turbine arrangement with a fifth guide device of exemplary design, which is centered on two sides and which forms an inflow channel for a twin-scroll (twin-volute) turbine spiral.

The fifth exemplary embodiment of the turbine arrangement 100 has a turbine spiral 120 with a first volute 122 and a second volute 124 (see FIGS. 8A and 8B). The first volute 122 and the second volute 124 are separated from one another in terms of flow by a partition 126 (approximately 360° incident flow through each of the volutes 122, 124, that is to say twin-scroll turbine or turbine arrangement or twin-flow turbine or twin-flow turbine housing). That is to say, the turbine arrangement 100 of the fifth embodiment is designed for use in a twin-flow turbine. In this refinement, the carrier ring 210 furthermore comprises a third ring element 218, which is arranged axially between the first ring element 212 and the second ring element 216. The third ring element 218 is formed and arranged so as to run as an elongation of the partition 126 through the inflow channel 130. As illustrated in FIG. 8A, the third ring element 218 extends from the partition 126 as far as a radially inner end 132 of the inflow channel 130. In this way, the inflow channel 130 is separated into two axially adjacent inflow channel sections 130*a*, 130*b*. The third ring element 218 is connected via the guide blades 220 to the first and the second ring element 212, 216, such that guide blades 220 are each divided into a first blade section 220*a* in the first inflow channel section 130*a* and into a second blade section 220*b* in the second inflow channel section 130*b*. In alternative refinements, the third ring element 218 may also run only partially through the inflow channel 130. For example, the third ring element 218 may extend through a major part (as described above) of the inflow channel 130.

Figure 9:
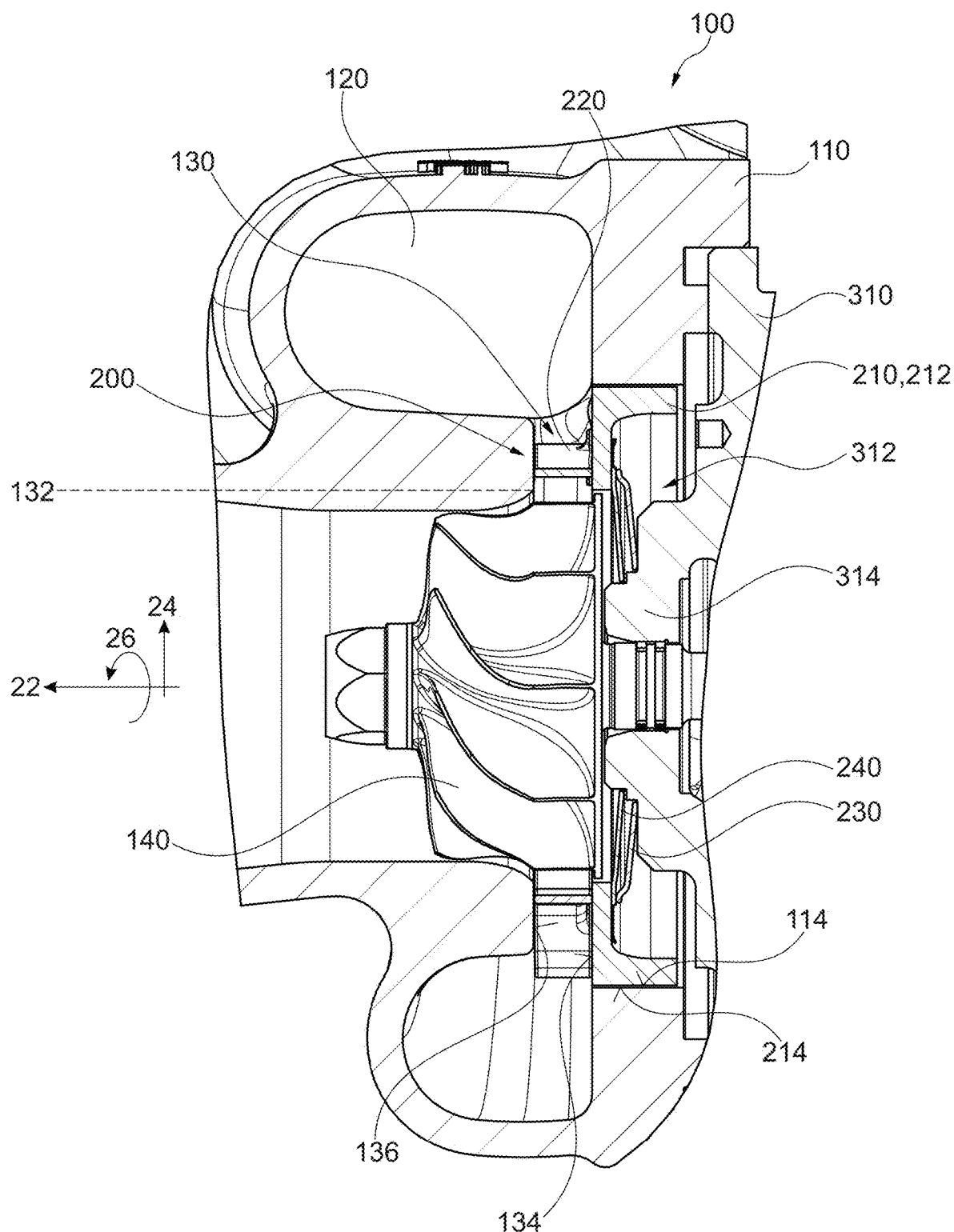
FIG. 9 shows the turbine arrangement with a sixth guide device of exemplary design, which is centered on one side.

FIG. 9 shows a sixth exemplary embodiment of the turbine arrangement 100. As can be seen in particular from the detail view of FIGS. 10A and 10B, the guide device 200 in this sixth exemplary embodiment comprises a carrier ring 210 with only a first ring element 212. The first ring element 212 is in this case arranged at the bearing housing side adjacent to the guide blades 220. The first ring element 212 forms substantially the entire first channel surface 134 of the inflow channel 130. Alternatively, the first ring element 212 forms only a major part of the first channel surface 134. The second channel surface 136 of the inflow channel 130 is formed by the turbine housing. Here, the carrier ring 210 is a part from a previously known VTG design. The guide blades 220 are likewise parts from previously known VTG designs. This means that the guide blades 220 are VTG guide blades, which are however connected not rotatably but cohesively to the carrier ring 210. The selection of the carrier ring 210 and of the guide blades 220 is performed here on the basis of the best-suited known VTG turbine with regard to its size, blade width and/or hole circle. In this way, the outlay on development, in particular the development time and costs, can be reduced. For example, a cost saving can be achieved through the use of existing designs or through the use of inexpensive mass-produced parts. Furthermore, tried and tested previously known designs can be used, which can lead to an increase in the reliability of the device. The carrier ring 210 and the guide blades 220 are formed as originally separate components and cohesively connected to one another. For example, the carrier ring 210 and the guide blades 220 may be formed as originally separate components and welded together or brazed together. By virtue of the guide blades 220 originally being provided separately, the guide blades 220 can be better reworked by cutting. This leads to a facilitation of a production process. Here, the guide blades 220 are connected in the predetermined orientation to the carrier ring 210. As indicated in particular by way of example in FIG. 10B, the guide blades 220 may each have a journal 226 and, by way of the respective journals 226, be inserted into and rigidly fastened, in particular welded, in corresponding bores of the carrier ring 210 in the predetermined orientation. It is advantageous here if the guide blades 220 are, by way of the respective journals 226, pressed into and rigidly fastened, in particular welded, in corresponding bores of the carrier ring 210 in the predetermined orientation. In alternative embodiments, the guide blades 220 may also comprise no journals and be mounted, and rigidly fastened, in particular welded or brazed, directly onto the carrier ring 210 or into corresponding depressions of the carrier ring in the predetermined orientation. If journals 226 are provided, the fastening, in particular welding, may be performed on one side or on both sides—that is to say at the turbine housing side and at the bearing housing side of the carrier ring 210 or of the first ring element 212.

In the sixth exemplary embodiment, the centering is performed on one side, in particular only at the compressor side. More specifically, the compressor-side centering is performed by way of the centering surface 114 of the turbine housing 110, against which the outer circumference 214 of the first ring element 212 lies. The centering surface 114 is a cylindrical centering surface, in particular a radially inwardly directed cylindrical centering surface. That is to say, the carrier ring 210 or the first ring element 212 is centered on the radially inwardly directed cylindrical centering surface 114. In other words, the carrier ring 210 is centered by way of an outer circumference 214 of the first ring element 212 on an inner circumference of the centering surface 114. In alternative refinements, the centering may also be implemented by means of a recess (not illustrated) in the turbine housing 110. The recess may be designed and arranged such that the guide blades 220 are inserted at least partially into the recess. By way of the leading edge 222 and/or the trailing edge 224, the guide blades 220 can lie against a radially inwardly and radially outwardly directed surface, respectively, of the recess and thereby be centered. The recess may be formed similarly to the recess 112 described above. Alternatively, the bearing-housing-side centering may be implemented by means of the spring element 230 or the heat shield 240. Here, an inner circumference 213 of the first ring element 212 may lie against an outer circumference 244 of the heat shield 240 or against an outer circumference 234 of the spring element 230. As a further alternative, the centering could also be performed by means of a plug-in connection 316 to the bearing housing 310, as described above.

In this sixth exemplary embodiment, the axial bracing is performed by means of the spring element 230, analogously to the exemplary embodiments of FIGS. 5A, 6A, 7A and 8A. That is to say, the turbine arrangement 100 of the sixth example comprises the heat shield 240 and the spring element 230. The heat shield 240 is arranged at the bearing housing side axially adjacent to the turbine wheel 140 and is of annular design. The heat shield 240 lies with a radially outer region against a radially inner region of the first ring element 212. The radially outer region of the heat shield 240 is in this case arranged at the bearing housing side axially adjacent to the radially inner region of the first ring element 212, so as to make contact in an axial direction. The spring element 230 is arranged at the bearing housing side axially adjacent to the heat shield 240. That is to say, the heat shield 240 is arranged axially between the guide device 200 (or first ring element 212, in particular radially inner region of the first ring element 212) and the spring element 230. The spring element 230 braces the guide device 200 or the carrier ring 210 against the turbine housing 110 via the heat shield 240. The spring element 230 is in the form of a disk spring. The spring element 230, by way of a radially outer end region, braces the radially outer region of the heat shield 240 against the radially inner region of the first ring element 212. The guide device 200 can thus be braced in an axial direction 22 against the turbine housing 110 via the heat shield 240. In alternative embodiments, the axial bracing could also be realized by means of a screw connection of the carrier ring 210 in the turbine housing 110.

Furthermore, the turbine housing 110 (in any embodiment) may comprise one or more axial compensation recesses (not visible in the figures). The one or more axial compensation recesses are designed to provide space for a thermal expansion of the guide blades 220 and/or of the second ring element 216 in an axial direction 22. Here, the one or more axial compensation recesses may be an annular recess, in particular an annular groove (for example similarly to the recess 112). The one or more axial compensation recesses are recessed in an axial direction 22 into the turbine housing 110 and arranged in the region of the inflow channel 130. More specifically, the one or more axial compensation recesses are recessed into a wall of the turbine housing 110 in an axial direction 22, which wall is arranged between the turbine spiral 120 and the turbine wheel 140 and is oriented substantially in an axial direction 22 toward a bearing housing 310. As an alternative to the one annular axial compensation recess or the one groove-like axial compensation recess, it is possible for multiple axial compensation recesses to be provided in the turbine housing 110, which multiple axial compensation recesses are arranged and formed so as to correspond to the number of guide blades 220 and so as to be arranged in each case adjacent to a respective guide blade 220 in an axial direction 22, such that the respective guide blade 220 can thermally expand into the adjacent axial compensation recess.

Figure 11A:
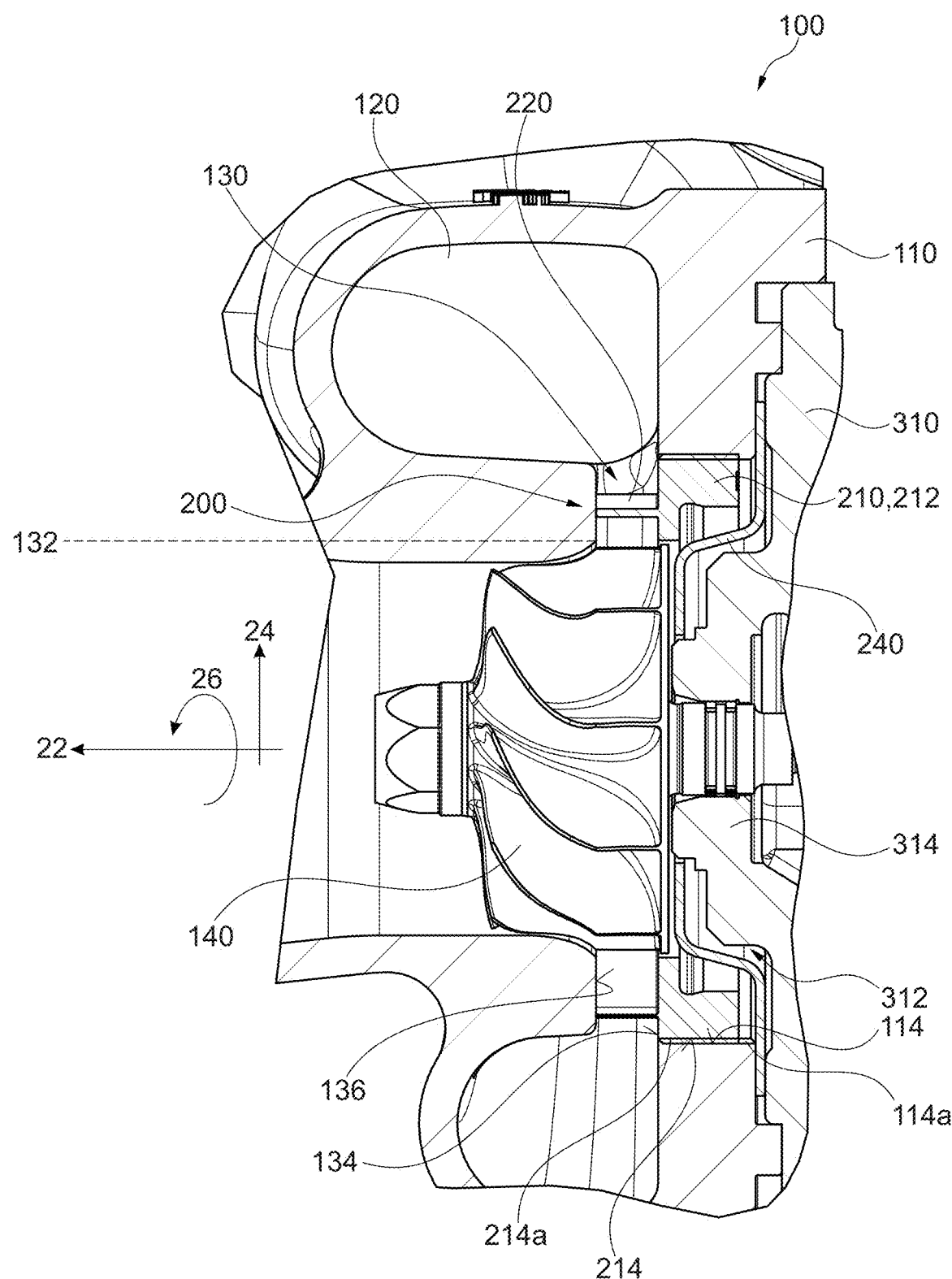
FIG. 11A shows the turbine arrangement with a seventh guide device of exemplary design, which is screw-connected.

FIG. 11A shows a seventh exemplary embodiment of the turbine arrangement 100. As can be seen in particular from the detail view of FIG. 11B, the guide device 200 in this seventh exemplary embodiment comprises a carrier ring 210 with only a first ring element 212. The first ring element 212 is in this case arranged at the bearing housing side adjacent to the guide blades 220. The first ring element 212 forms substantially the entire first channel surface 134 of the inflow channel 130. Alternatively, the first ring element 212 forms only a major part of the first channel surface 134. The second channel surface 136 of the inflow channel 130 is formed by the turbine housing 110. By contrast to the situation in the sixth exemplary refinement, the guide device 200 of this seventh exemplary refinement is produced integrally from one part. Furthermore, the axial bracing is performed by means of a screw connection in the turbine housing 110. A spring element 230 is not necessary in this refinement, though could also be provided in an alternative modification. In this way, it would for example be possible for an inadvertent release, in particular unscrewing, of the guide device 200 to be prevented. In the seventh exemplary embodiment, the centering is performed on one side, in particular only at the compressor side, analogously to the centering of the sixth exemplary embodiment, by way of the centering surface 114. The centering may however also be implemented in some other manner as an alternative to that described in conjunction with the sixth exemplary embodiment.

Figure 11B:
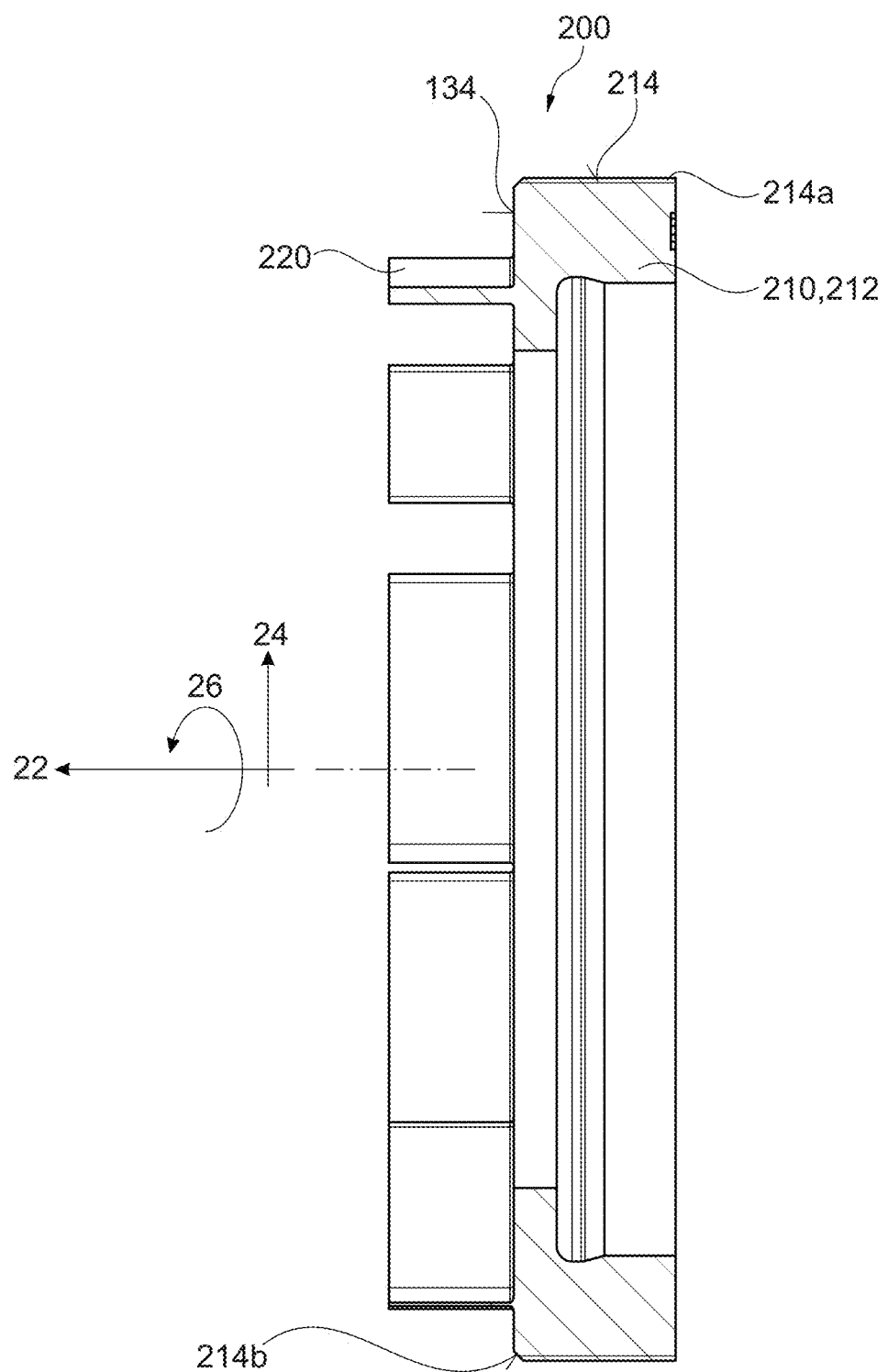
FIG. 11B shows a detail view of the guide device from FIG. 11A.

In the exemplary embodiment of FIGS. 11A and 11B, the axial bracing of the guide device 200 is implemented by means of a screw connection of the guide device 200 in the turbine housing 110. Here, the carrier ring 210 is, by way of an external thread 214a on the outer circumference 214 of the first ring element 212, screwed together with the turbine housing 110 by way of an internal thread 114a on the inner circumference of the centering surface 114. By means of this advantageous design, both centering and axial securing or bracing of the guide device 200 in the turbine housing 110 can be provided. Additional securing elements, for example a spring element, are possible but are not necessary. Here, the carrier ring 210 is screwed into the turbine housing such that a section of the first channel surface 134 formed by the first ring element 212 terminates flush with the turbine housing 110 on the side of the turbine spiral 120. As can be seen in particular in FIG. 11B, the carrier ring 210 has an encircling bevel 214b on a turbine-housing-side edge on the outer circumference 214 of the first ring element 212. Precise and stable positioning of the guide device 200 can be achieved by means of the centering by way of the outer circumference 214. The assembly process can furthermore be simplified. By means of the screw connection, the assembly process can likewise be simplified. Furthermore, costs can be reduced because axial bracing by means of an additional spring element 230 is not necessary, though this is possible. By means of the bevel 214b, turbulent flows in the inflow channel 130 can be prevented or at least reduced.

Even though the bevel 214b is not illustrated in the figures of the other exemplary embodiments, the guide devices 200 of the other exemplary embodiments may likewise have one or more such bevels 214b (also possible at other edges for the purposes of reducing turbulent flows). In alternative refinements, it is also possible, instead of the bevel, for rounded portions to be provided at the corresponding edges for the purposes of reducing turbulent flows.

The turbine arrangement of FIG. 11A furthermore comprises the heat shield 240. In this example, the heat shield 240 is however not mounted on the axial projection 314 of the bearing housing 310 but is flange-mounted between the turbine housing 110 and the bearing housing 310. The heat shield 240 is of ring-shaped or plate-shaped form and is clamped by way of a radially outer region between the turbine-side bearing flange and a flange of the turbine housing 110.

Figure 10B:
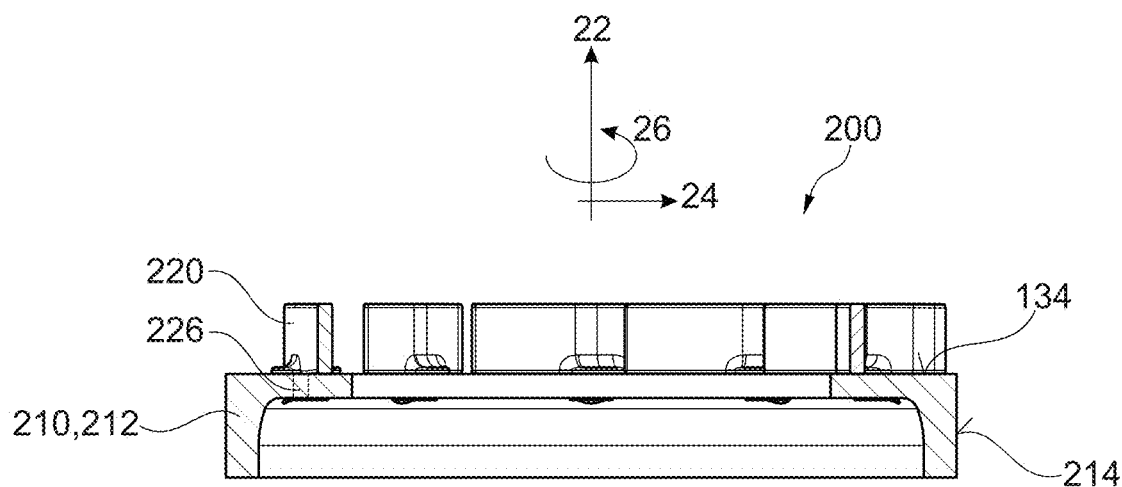

In alternative refinements (not illustrated in the figures), the guide device 100 of the refinement as per FIGS. 11A and 11B (guide device formed as a single piece or integrally as a cast part with only the first ring element 212) may also comprise a spring element 230 and a heat shield 240 like the guide arrangement 200 of FIGS. 9, 10A and 10B. The guide device 200 comprises the carrier ring 210 with only a first ring element 212. The first ring element 212 is in this case arranged at the bearing housing side adjacent to the guide blades 220. The first ring element 212 forms substantially the entire first channel surface 134 of the inflow channel 130 (alternatively only a major part of the first channel surface 134, as described further above). The second channel surface 136 of the inflow channel 130 is formed by the turbine housing 110. In this case, the guide device 200 is not screwed into the turbine housing 110, and comprises no external thread 214a. Also, the turbine housing 110 or the centering surface 114 does not need to comprise an internal thread 114a. The guide device 200 is then braced in an axial direction against the turbine housing 110 by means of the spring element 230 (see also the description relating to the exemplary embodiments of FIGS. 5A, 6A, 7A, 8A and 9). The heat shield 240 is arranged at the bearing housing side axially adjacent to the turbine wheel 140 and is of annular design. The heat shield 240 lies with a radially outer region against a radially inner region of the first ring element 212. The radially outer region of the heat shield 240 is in this case arranged at the bearing housing side axially adjacent to the radially inner region of the first ring element 212, so as to make contact in an axial direction. The spring element 230 is arranged at the bearing housing side axially adjacent to the heat shield 240. That is to say, the heat shield 240 is arranged axially between the guide device 200 (or first ring element 212, in particular radially inner region of the first ring element 212) and the spring element 230. The spring element 230 braces the guide device 200 or the carrier ring 210 against the turbine housing 110 via the heat shield 240. The spring element 230 is in the form of a disk spring. The spring element 230, by way of a radially outer end region, braces the radially outer region of the heat shield 240 against the radially inner region of the first ring element 212. The guide device 200 can thus be braced in an axial direction 22 against the turbine housing 110 via the heat shield 240. In alternative embodiments, the axial bracing could also be realized by means of a screw connection of the carrier ring 210 in the turbine housing 110. The centering in this additional alternative example is performed on one side, in particular at the compressor side, and may be performed by means of the plug-in connection 316 (as described above with regard to the embodiments of FIGS. 5A, 6A, 7A and 8A, preferably with two axial bores 215 and, correspondingly, two bolts) or by means of contacting abutment of the outer circumference 214 of the first ring element 212 against the centering surface 114 of the turbine housing 110. If a plug-in connection 316 to the bearing housing 310 is selected, the carrier ring 210 is configured to be centered in a bearing housing 310 of the supercharging device 10 by means of one or more bolts distributed in a circumferential direction 26, in particular two or more bolts. More specifically, the first ring element 212 is configured to be centered in a bearing housing 310 of the supercharging device 10 by means of one or more bolts distributed in a circumferential direction 26. For this purpose, the first ring element 212 has one or more, in particular two or more, axial bores 215 which are distributed in a circumferential direction 26. Here, the axial bores 215 are arranged and designed to be connected to the bearing housing 310 by means of bolts. That is to say, the axial bores 215 are recessed into an axial end surface, directed toward the bearing housing 310, of the first ring element 212. In alternative refinements, the bolts may also be integrally connected to the carrier ring 210 or to the bearing housing 310. Here, the plug-in connection 316 may be designed to fix the guide device 200 relative to the turbine wheel 140. In further alternative embodiments, use may also be made of other plug-in connections, in particular plug-in elements other than bolts. Alternatively, the bearing-housing-side centering may be implemented by means of the spring element 230 or the heat shield 240. Here, an inner circumference 213 of the first ring element 212 may lie against an outer circumference 244 of the heat shield 240 or against an outer circumference 234 of the spring element 230.

Figure 12A:
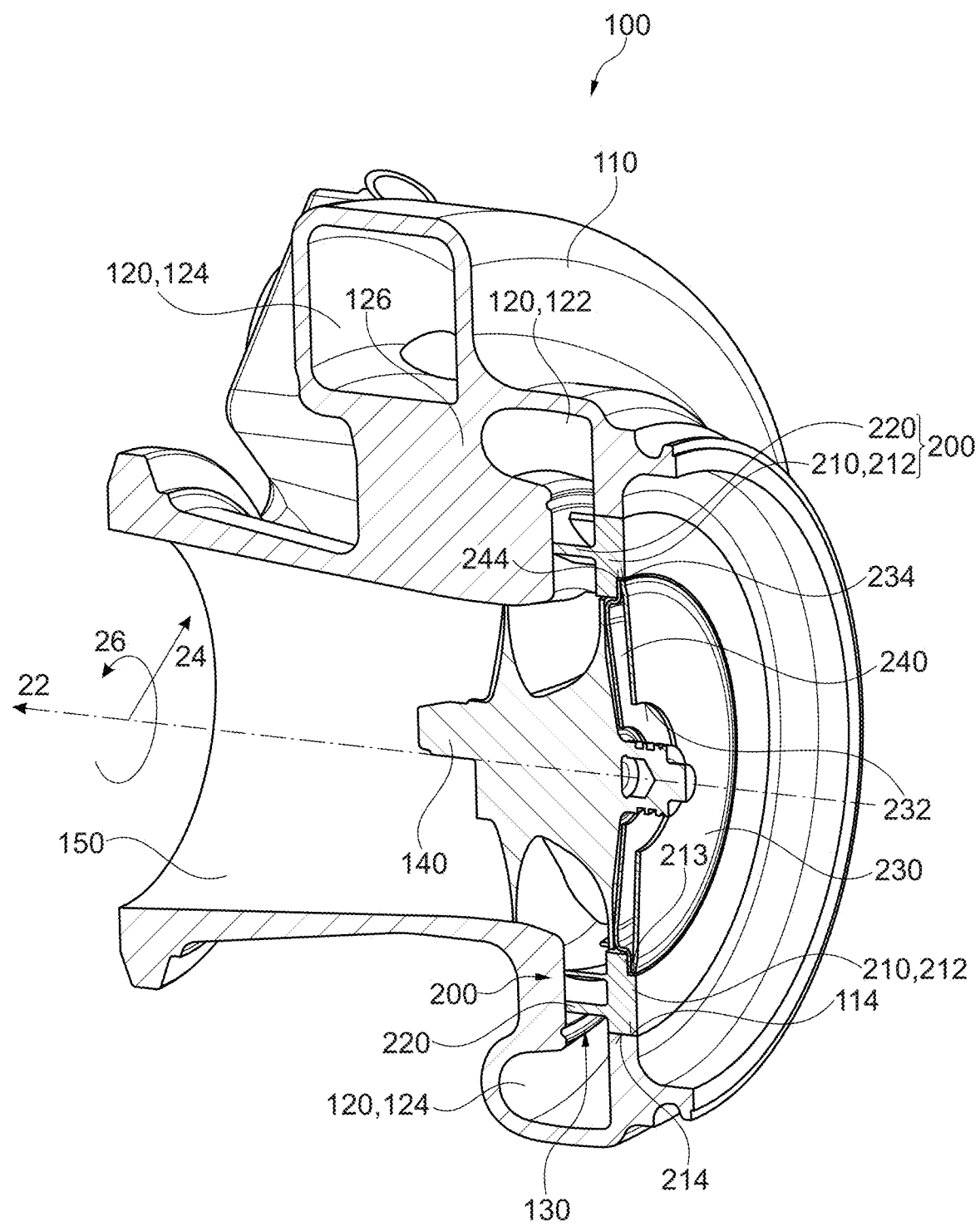
FIG. 12A shows a sectional side view of the turbine arrangement along the axial direction of the turbine arrangement with an eighth guide device of exemplary design for a twin-scroll (dual-volute) turbine spiral.
Figure 12B:
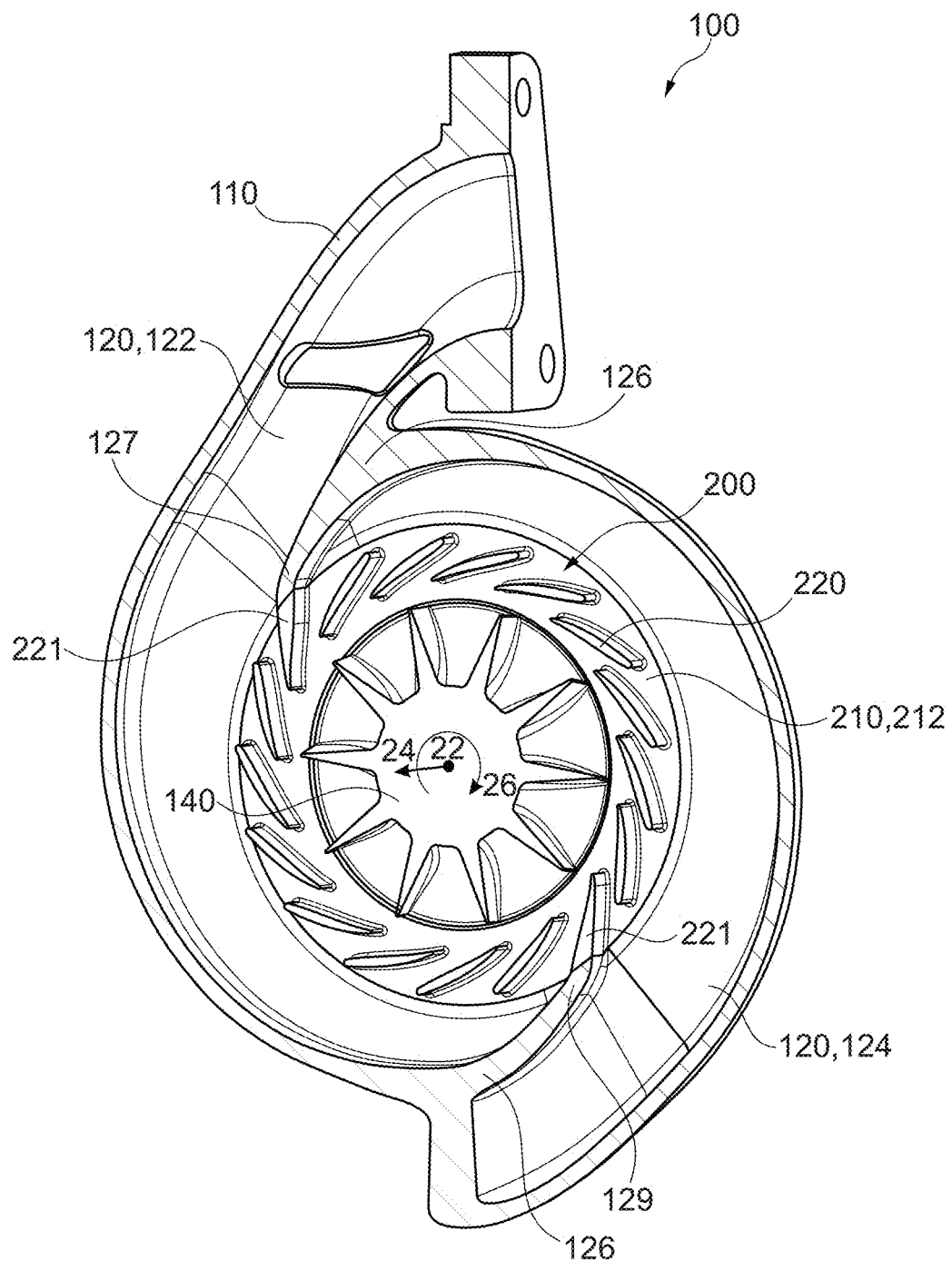
FIG. 12B shows the turbine arrangement from FIG. 12A in a sectional view along a radial plane.

The eighth exemplary embodiment shows a turbine arrangement 100 for use in a dual-volute turbine (see FIGS. 12A and 12B). The turbine spiral 120 comprises a first volute 122 and a second volute 124. The first volute 122 and the second volute 124 are separated in terms of flow by a partition 127 formed in the turbine housing 110. The partition 127 opens into a first turbine housing tongue 127 and into a second turbine housing tongue 129, which end at a radially inner end of the turbine spiral 120 (see FIG. 12B). In other words, the turbine housing tongues 127, 129 extend as far as a radially outer circumference of the guide device 200 or as far as a radially outer end of the inflow channel. The turbine housing tongues 127, 129 are arranged spaced apart from one another in the circumferential direction 26, preferably by 180°. In alternative refinements, the turbine housing tongues 127, 129 may for example be spaced apart from one another in a circumferential direction 26 by 175° and 185° respectively or 170° and 190° respectively. Other spacings, for example between 160° to 200°, are possible. In particular, it is possible here for in each case radially inner end sections of the turbine housing tongues 127, 129 to be correspondingly spaced apart from one another in the circumferential direction 26. It is thus possible during operation for fluids to be guided in the circumferential direction 26, in a manner separated in terms of flow, from the volutes 122, 124 into the guide device 200. In other words, the first volute 122 and the second volute 124 open into the guide device 200 in a manner separated in terms of flow between the first turbine housing tongue 127 and the second turbine housing tongue 129. That is to say, the turbine arrangement 100 is formed as a dual-volute turbine arrangement. By contrast to the twin-volute turbine arrangement 100 described with regard to FIG. 8A, in the case of which the volutes 122, 124 each open into the guide device 200 over the entire circumference in a manner axially separated from one another, the volutes 122, 124 of the dual-volute turbine arrangement 100 open into the guide device 200 in each case only over a section of the circumference (in the case of an exemplary 180° offset of the turbine housing tongues 127, 129, in each case over substantially half of the circumference) in a manner separated from one another in a circumferential direction. The guide device 200 (or the carrier ring 210) in the dual-volute turbine arrangement is designed such that it can be impinged on over a radially outer circumference by outlets, which are fluidically separate in a circumferential direction 26, of the two volutes 122, 124.

As can be seen in particular from the sectional view of FIG. 12A, the guide device 200 in this eighth exemplary embodiment comprises a carrier ring 210 with only a first ring element 212. The first ring element 212 is in this case arranged at the bearing housing side adjacent to the guide blades 220. The first ring element 212 forms substantially the entire first channel surface 134 of the inflow channel 130 (alternatively only a major part of the first channel surface 134, as described further above). The second channel surface 136 of the inflow channel 130 is formed by the turbine housing 110. As described in the seventh exemplary embodiment, the guide device 200 of this eighth exemplary embodiment is produced integrally from one part. It would alternatively also be possible for the guide device 200 to be produced as a single piece, as described above.

Two of the guide blades 220 are formed as tongue guide blades 221. The tongue guide blades 221 are arranged adjacent to the turbine housing tongues 127, 129. In other words, the tongue guide blades 221 are arranged on the carrier ring 210 so as to be adjacent to the turbine housing tongues 127, 129. In this way, a separation of the volutes 122, 124 in terms of flow can be continued in the guide device 200 (at least as far as the trailing edge of the tongue guide blades 221). That is to say, in each case one inflow channel section can be formed in each case to one side in a circumferential direction 26 between the tongue guide blades 221. In each case one volute flow (that is to say a fluid flow passing from the first volute 122 or the second volute 124 respectively) can be guided through in each case one inflow channel section. In other words, the separated fluid flows from the volutes 122, 124 can thus be continued as separated fluid flows in respective inflow channel sections through the guide device 200 as far as the compressor wheel 140. Here, the tongue guide blades 221 may be of identical form to the other guide blades 220, or may be modified as shown in FIG. 12B. The tongue guide blades 221 may be of identical form, as shown in FIG. 12B, or may be of different form. In the example of FIG. 12B, the tongue guide blades 221, in particular the radially inner end sections (or trailing edges) thereof and the radially outer end sections thereof, are arranged so as to be offset in a circumferential direction by 180°. In other refinements, the tongue guide blades 221, or the radially outer end sections and/or radially inner end sections thereof, may also, analogously to the above-described offset of the turbine housing tongues 127, 129, have other spacings in a circumferential direction 26 (for example 175° and 185° respectively). In particular, a radially inner end section of the tongue guide blade 221 that is adjacent to the first turbine housing tongue 127 may be arranged spaced apart in a circumferential direction 26 by 175° from a radially inner end section of the tongue guide blade 221 that is adjacent to the second turbine housing tongue 129. Then, proceeding further in a circumferential direction 26, the radially inner end section of the tongue guide blade 221 that is adjacent to the second turbine housing tongue 129 would be arranged spaced apart in a circumferential direction 26 by 185° from the radially inner end section of the tongue guide blade 221 that is adjacent to the first turbine housing tongue 127. Advantageous effects can be attained by means of the different circumferential angle segments (for example 175° in one circumferential direction and 185° in the oppositely oriented circumferential direction) formed in the circumferential direction 26 between the radially inner end sections of the tongue guide blades 221. In this way, the fluid flows are guided from the respective inflow channel sections onto the turbine wheel 140 along different circumferential angle segments, whereby adverse excessive frequency increases can be avoided. An analogous effect can also be achieved with two tongue guide blades 221 of identical form if the turbine housing tongues 127, 129 are arranged so as to be correspondingly offset in a circumferential direction 26.

The guide device 200 is inserted into the turbine housing such that the tongue guide blades 221 are arranged adjacent to the turbine housing tongues 127, 129. In particular, the guide device 200 is arranged and formed in the turbine housing 120 such that in each case one of the tongue guide blades 221 is arranged as an elongation of in each case one of the turbine housing tongues 127, 129, such that a separation of the volutes 122, 124 in terms of flow is continued in the guide device 200 (at least as far as the trailing edge of the tongue guide blades 221). A radially inner end of the respective turbine housing tongue 127, 129 is arranged substantially flush with a radially outer end (or end section) of the respective tongue blade 221. In this way, a guidance of flow from the volutes 122, 124 into the guide device 200 can be improved.

Basically, the circumferential angle segment over which the volutes 122, 124 of the dual-volute turbine arrangement 100 flow into the guide device 200 in a manner separated from one another in a circumferential direction may be maintained by means of a corresponding design of the guide device 200, in particular by means of a corresponding design of the tongue guide blades 221. Alternatively, the tongue guide blades 221 may also be of different form such that a circumferential angle segment at the outlet of the separated fluid flow from the guide device 200 to the turbine wheel 140 differs from the circumferential angle segment of the fluid flow from the respective volute 122, 124 into the guide ring 200. This is advantageous in particular if, in this way, the fluid flows can be guided along different circumferential angle segments from the respective inflow channel sections onto the turbine wheel 140.

In the eighth exemplary embodiment, the centering is performed on one side, in particular only at the bearing housing side. More specifically, the bearing-housing-side centering is performed by way of the centering surface 114 of the turbine housing 110, against which the outer circumference 214 of the first ring element 212 lies (see FIG. 12A). The centering surface 114 is a cylindrical centering surface, in particular a radially inwardly directed cylindrical centering surface. That is to say, the carrier ring 210 or the first ring element 212 is centered on the radially inwardly directed cylindrical centering surface 114. In other words, the carrier ring 210 is centered by way of an outer circumference 214 of the first ring element 212 on an inner circumference of the centering surface 114. In alternative refinements, the centering may also be implemented by means of a recess (not illustrated) in the turbine housing 110. The recess may be designed and arranged such that the guide blades 220 are inserted at least partially into the recess. By way of the leading edge 222 and/or the trailing edge 224, the guide blades 220 can lie against a radially inwardly and radially outwardly directed surface, respectively, of the recess and thereby be centered. The recess may be formed analogously to the recess 112 described above. Alternatively or in addition to the centering by way of the centering surface 114, the bearing-housing-side centering could be implemented by means of the spring element 230 or the heat shield 240. Here, an inner circumference 213 of the first ring element 212 may lie against an outer circumference 244 of the heat shield 240 or against an outer circumference 234 of the spring element 230. As a further alternative, the centering could also be performed by means of a plug-in connection 316 to the bearing housing 310, as described above.

In the eighth exemplary embodiment, the axial bracing is performed by means of the spring element 230, analogously to the exemplary embodiments of FIGS. 5A, 6A, 7A and 8A. That is to say, the turbine arrangement 100 of the eighth example comprises the heat shield 240 and the spring element 230. The heat shield 240 is arranged at the bearing housing side axially adjacent to the turbine wheel 140 and is of annular design. The heat shield 240 lies with a radially outer region against a radially inner region of the first ring element 212. The radially outer region of the heat shield 240 is in this case arranged at the bearing housing side axially adjacent to the radially inner region of the first ring element 212, so as to make contact in an axial direction. The spring element 230 is arranged at the bearing housing side axially adjacent to the heat shield 240. That is to say, the heat shield 240 is arranged axially between the guide device 200 (or first ring element 212, in particular radially inner region of the first ring element 212) and the spring element 230. The spring element 230 braces the guide device 200 or the carrier ring 210 against the turbine housing 110 via the heat shield 240. The spring element 230 is in the form of a disk spring. The spring element 230, by way of a radially outer end region, braces the radially outer region of the heat shield 240 against the radially inner region of the first ring element 212. The guide device 200 can thus be braced in an axial direction 22 against the turbine housing 110 via the heat shield 240. In alternative embodiments, the axial bracing could also be realized by means of a screw connection of the carrier ring 210 in the turbine housing 110.

In alternative refinements of a dual-volute turbine arrangement 100, a second ring element 216 may be provided, analogously to the exemplary embodiments of FIGS. 5A, 6A and 7A.

Figure 13A:
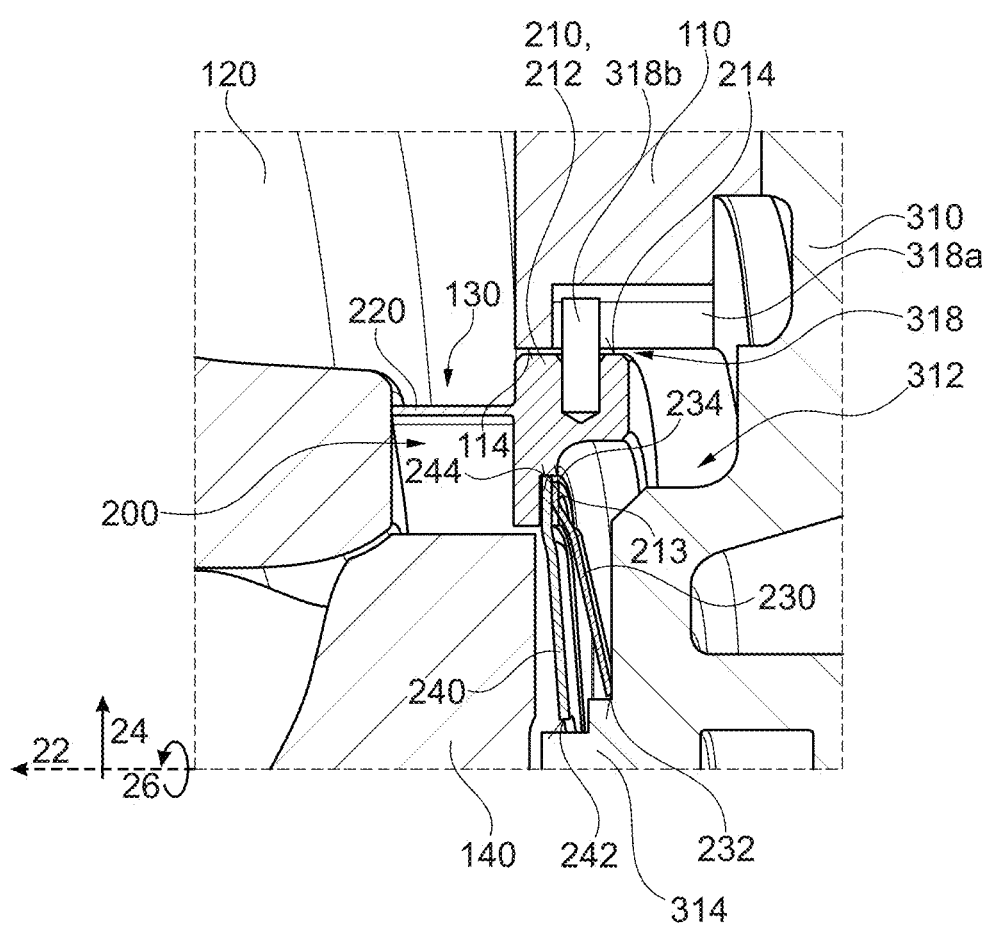
FIG. 13A shows the turbine arrangement with a ninth guide device of exemplary design, which has a rotation-preventing securing means.
Figure 13B:
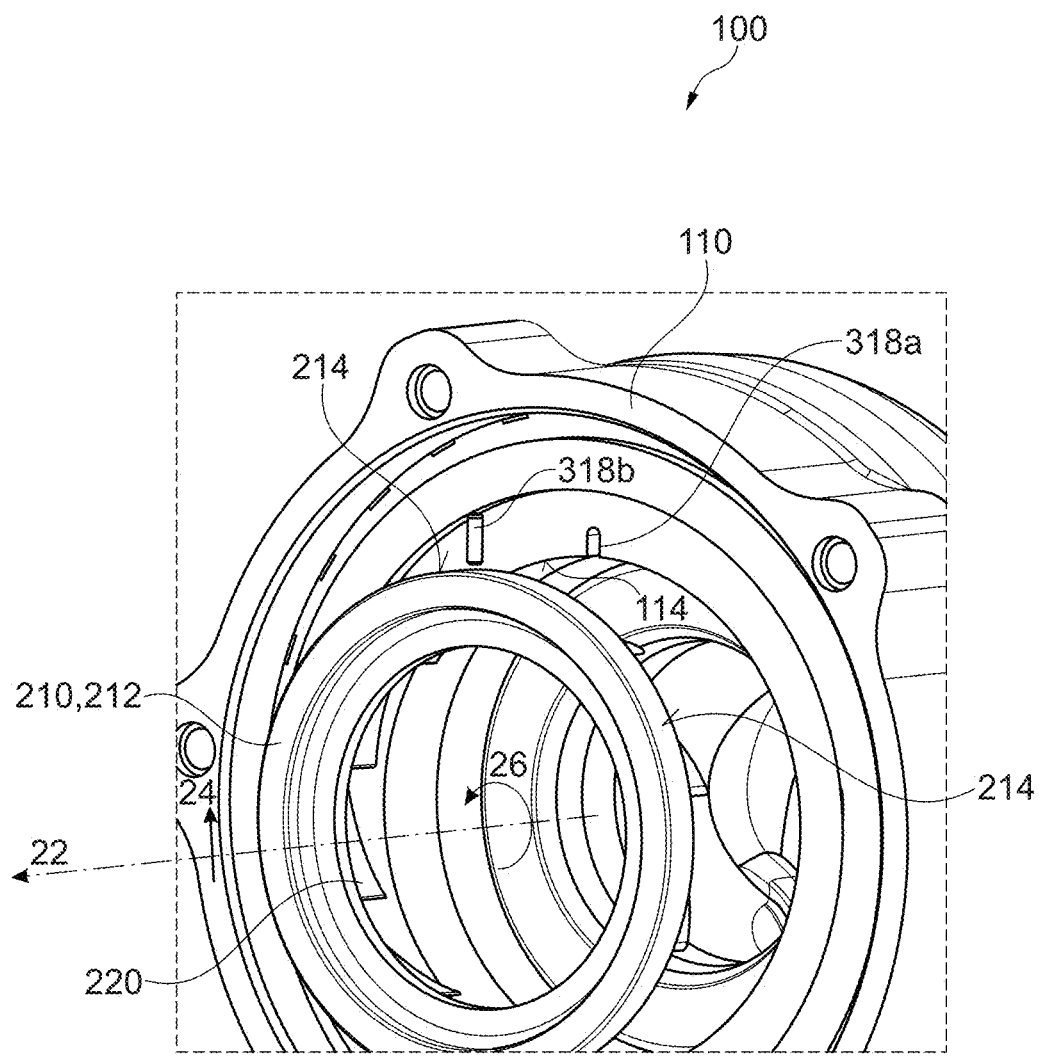
FIG. 13B shows the turbine arrangement from FIG. 13A during the insertion of the guide device.

The ninth exemplary embodiment shows a turbine arrangement 100 with a rotation-preventing securing means 318 (see FIGS. 13A and 13B). The rotation-preventing securing means 318 is designed to substantially prevent or at least restrict a rotation of the guide device 200 in a circumferential direction 26. As can be seen in particular from the sectional view of FIG. 13A, the guide device 200 in this ninth exemplary embodiment comprises a carrier ring 210 with only a first ring element 212. The first ring element 212 is in this case arranged at the bearing housing side adjacent to the guide blades 220. The first ring element 212 forms substantially the entire first channel surface 134 of the inflow channel 130 (alternatively only a major part of the first channel surface 134, as described further above). The second channel surface 136 of the inflow channel 130 is formed by the turbine housing 110. As in the seventh exemplary embodiment, the guide device 200 of this ninth exemplary embodiment is produced integrally from one part. It would alternatively also be possible for the guide device 200 to be produced as a single piece, as described above.

In the ninth exemplary embodiment, the centering is performed on one side, in particular only at the bearing housing side. More specifically, the bearing-housing-side centering is performed by way of the centering surface 114 of the turbine housing 110, against which the outer circumference 214 of the first ring element 212 lies (see FIG. 13A). The centering surface 114 is a cylindrical centering surface, in particular a radially inwardly directed cylindrical centering surface. That is to say, the carrier ring 210 or the first ring element 212 is centered on the radially inwardly directed cylindrical centering surface 114. In other words, the carrier ring 210 is centered by way of an outer circumference 214 of the first ring element 212 on an inner circumference of the centering surface 114. In alternative refinements, the centering may also be implemented by means of a recess (not illustrated) in the turbine housing 110. The recess may be designed and arranged such that the guide blades 220 are inserted at least partially into the recess. By way of the leading edge 222 and/or the trailing edge 224, the guide blades 220 can lie against a radially inwardly and radially outwardly directed surface, respectively, of the recess and thereby be centered. The recess may be formed analogously to the recess 112 described above. Alternatively or in addition to the centering by way of the centering surface 114, the bearing-housing-side centering could be implemented by means of the spring element 230 or the heat shield 240. Here, an inner circumference 213 of the first ring element 212 may lie against an outer circumference 244 of the heat shield 240 or against an outer circumference 234 of the spring element 230. As a further alternative, the centering could also be performed by means of a plug-in connection 316 to the bearing housing 310, as described above.

In the ninth exemplary embodiment, the axial bracing is performed by means of the spring element 230, analogously to the exemplary embodiments of FIGS. 5A, 6A, 7A, 8A and 12A. That is to say, the turbine arrangement 100 of the ninth example comprises the heat shield 240 and the spring element 230. The heat shield 240 is arranged at the bearing housing side axially adjacent to the turbine wheel 140 and is of annular design. The heat shield 240 lies with a radially outer region against a radially inner region of the first ring element 212. The radially outer region of the heat shield 240 is in this case arranged at the bearing housing side axially adjacent to the radially inner region of the first ring element 212, so as to make contact in an axial direction. The spring element 230 is arranged at the bearing housing side axially adjacent to the heat shield 240. That is to say, the heat shield 240 is arranged axially between the guide device 200 (or first ring element 212, in particular radially inner region of the first ring element 212) and the spring element 230. The spring element 230 braces the guide device 200 or the carrier ring 210 against the turbine housing 110 via the heat shield 240. The spring element 230 is in the form of a disk spring. The spring element 230, by way of a radially outer end region, braces the radially outer region of the heat shield 240 against the radially inner region of the first ring element 212. The guide device 200 can thus be braced in an axial direction 22 against the turbine housing 110 via the heat shield 240.

The rotation-preventing securing means 318 is formed by a pocket 318a and a pin 318b which engages radially into the pocket 318a. In the exemplary refinement of FIGS. 13A and 13B, the pocket 318a is recessed into a radially inwardly directed cylindrical centering surface 114 of the turbine housing 110. The pin 318b is arranged and formed on the carrier ring 210 such that the pin 318b engages radially outwardly into the pocket 318a from an outer circumference 214 of the carrier ring 210. That is to say, the pin 318b extends radially outward from the outer circumference 214 of the carrier ring 210 (or of the first ring element 212). As can be seen from FIG. 13B, the pocket 318a is designed to be open toward a surface directed axially toward the bearing housing 310, such that the pin 318b (together with the carrier ring 210) can be inserted axially into the pocket 318a during the assembly process. Here, the pocket 318a and the pin 318b are dimensioned such that an insertion in an axial direction 22 is made possible, and a relative displacement of the pin 318b in the pocket 318a in a circumferential direction 26 is prevented or at least minimized. In alternative refinements, the pocket 318a may also be arranged in the carrier ring 210 (or in the first ring element 212) and the pin 318b may be arranged on the turbine housing. It is furthermore possible for multiple pockets 318a and pins 318b to be provided, which are arranged in a correspondingly distributed manner in a circumferential direction 26 on the carrier ring 210 and on the centering surface 114, such that in each case one pin 318b engages into in each case one pocket 318a in order to secure the guide device 200 against rotation relative to the turbine housing 110.

The rotation-preventing securing means 318 may self-evidently also be combined with the other exemplary embodiments described here. In particular, the rotation-preventing securing means 318 is advantageous in combination with a dual-volute turbine arrangement 100.

Even though the heat shield 240 has been shown in all exemplary refinements, said heat shield is not imperatively necessary (centering may also be performed by alternative means). If the guide device 200 is braced axially by means of the spring element 230, the spring element 230 may then be designed to brace the guide device 200 axially directly against the turbine housing.

Although the present invention has been described above and defined in the appended claims, it should be understood that the invention may alternatively also be defined in accordance with the following embodiments:

1. A turbine arrangement (100) for a supercharging device (10), comprising:
   a turbine housing (110) which defines a turbine spiral (120) and a turbine outlet (150),
   a turbine wheel (140) which is arranged in the turbine housing (110) between the turbine spiral (120) and the turbine outlet (150), and
   a guide device (200) having:
      a carrier ring (210), and
      multiple guide blades (220) which are arranged on the carrier ring (210) fixedly in a predetermined orientation,
   wherein the guide device (200) is arranged in an inflow channel (130) between the turbine spiral (120) and the turbine wheel (140) such that, during operation, fluids are conducted from the turbine spiral (120) through the inflow channel (130) over the guide blades (220) onto the turbine wheel (140).

2. The turbine arrangement (100) according to embodiment 1, wherein the guide device (200) is formed as a separate component.

3. The turbine arrangement (100) according to either of the preceding embodiments, wherein the guide device (200) is inserted into the turbine housing (110).

4. The turbine arrangement (100) according to any of the preceding embodiments, wherein the guide device (200) is formed as a single piece.

5. The turbine arrangement (100) according to any of the preceding embodiments, wherein the carrier ring (210) is centered in the turbine housing (110).

6. The turbine arrangement (100) according to embodiment 5, wherein the carrier ring (210) is inserted in an axial direction (22) into an annular recess (112), in particular a groove, of the turbine housing (110).

7. The turbine arrangement (100) according to embodiment 6, wherein the carrier ring (210) comprises a first ring element (212) and a second ring element (216) which are axially spaced apart from one another and between which the guide blades (220) are arranged, in particular wherein the second ring element (216) is inserted into the annular recess (112) such that only the guide blades (220) are situated in the inflow channel (130).

8. The turbine arrangement (100) according to embodiment 7, wherein the inflow channel (130) is at least partially formed axially between the first ring element (212) and the second ring element (216).

9. The turbine arrangement (100) according to any of the preceding embodiments, wherein the carrier ring (210) is centered on a radially inwardly directed cylindrical centering surface (114) of the turbine housing (110).

10. The turbine arrangement (100) according to embodiment 9, wherein the carrier ring (210) comprises at least one first ring element (212) on which the guide blades (220) are arranged at the turbine housing side in an axial direction (22), and wherein the carrier ring (210) is centered by way of an outer circumference (214) of the first ring element (212) on an inner circumference of the centering surface (114), and optionally wherein the turbine housing (110) comprises one or more axial compensation recesses which are designed to provide space for a thermal expansion of the guide blades (220) in an axial direction (22).

11. The turbine arrangement (100) according to embodiment 10, wherein the carrier ring (210) is, by way of an external thread (214a) on the outer circumference (214) of the first ring element (212), screwed together with the turbine housing (110) by way of an internal thread (114a) on the inner circumference of the centering surface (114).

12. The turbine arrangement (100) according to any of the preceding embodiments, wherein the carrier ring (210) is configured to be centered in a bearing housing (310) of the supercharging device (10) by means of a plug-in connection (316), in particular by means of one or more bolts distributed in a circumferential direction (26).

13. The turbine arrangement (100) according to embodiment 12, wherein the carrier ring (210) has one or more axial bores (215) which are distributed in a circumferential direction (26) and which are arranged and designed to be connected to the bearing housing (310) by means of bolts.

14. The turbine arrangement (100) according to any of the preceding embodiments, furthermore comprising a heat shield (240) which is arranged at the bearing housing side axially adjacent to the turbine wheel (140).

15. The turbine arrangement (100) according to embodiment 14, wherein the heat shield (240) is of annular design, and optionally wherein the carrier ring (210) is centered on the heat shield (240).

16. The turbine arrangement (100) according to embodiment 15, wherein the carrier ring (210) comprises at least one first ring element (212) on which the guide blades (220) are arranged at the turbine housing side in the axial direction (22), and wherein an inner circumference (213) of the first ring element (212) lies against an outer circumference (244) of the heat shield (240).

17. The turbine arrangement (100) according to any of the preceding embodiments, furthermore comprising a spring element (230) which is arranged at the bearing housing side axially adjacent to the carrier ring (210) and which is designed to brace the guide device (200) in an axial direction (22) against the turbine housing (110).

18. The turbine arrangement (100) according to embodiment 17, wherein the spring element (230) is formed as a plate spring, and optionally wherein the carrier ring (210) is centered on the spring element (230).

19. The turbine arrangement (100) according to embodiment 18, wherein the carrier ring (210) comprises at least one first ring element (212) on which the guide blades (220) are arranged at the turbine housing side in the axial direction (22), and wherein an inner circumference (213) of the first ring element (212) lies against an outer circumference (234) of the spring element (230).

20. The turbine arrangement (100) according to any of the preceding embodiments, wherein the guide blades (220) project as far as a short distance in front of the turbine wheel (140), in particular as far as the radially inner end (132) of the inflow channel (130).

21. The turbine arrangement (100) according to any of the preceding embodiments, wherein the guide device (200) has three to thirty, in particular three to fifteen, preferably four to twelve, preferably five to ten and particularly preferably six to nine guide blades (220).

22. The turbine arrangement (100) according to any of the preceding embodiments, wherein the guide blades (220) are fixed to the carrier ring (210) in the predetermined orientation such that said guide blades guide fluids onto the turbine wheel (140) in an inflow direction (223) at an angle ($\alpha$) relative to the circumferential direction (26), wherein the angle ($\alpha$) lies in a range between 100° to 170°, optionally between 110° to 160°, preferably 120° to 150° and particularly preferably 130° to 140°.

23. The turbine arrangement (100) according to any of the preceding embodiments, wherein the carrier ring (210) comprises a first ring element (212) and a second ring element (216) which are axially spaced apart from one another and between which the guide blades (220) are arranged.

24. The turbine arrangement (100) according to embodiment 23, wherein the guide blades (220) extend from the ring elements (212, 216) radially inward, in particular as far as the radially inner end (132) of the inflow channel (130).

25. The turbine arrangement (100) according to either of embodiments 23 and 24, if at least dependent on embodiment 15, wherein the heat shield (240) has a channel section (243) in a radially outer end region, wherein a bearing housing side of the inflow channel (130) radially within the second ring element (216) is formed at least partially, in particular entirely, by the channel section (243).

26. The turbine arrangement (100) according to embodiment 25, if at least dependent on embodiment 17, wherein the heat shield (240) is arranged axially between the spring element (230) and the guide device (200), and wherein the spring element (230) is designed to brace the guide device (200) in an axial direction (22) against the turbine housing (110) via the channel section (243).

27. The turbine arrangement (100) according to either of embodiments 25 and 26, wherein the channel section (243) has a U-shaped cross section with a radially outer limb and a radially inner limb, and wherein an inner circumference (213) of the first ring element (212) lies against an outer circumference (244) of the radially outer limb of the U-shaped cross section.

28. The turbine arrangement (100) according to embodiment 27, if at least dependent on embodiment 17, wherein the heat shield (240) is arranged axially between the spring element (230) and the guide device (200), and wherein the spring element (230) projects with a radially outer end region at the bearing housing side into the U-shaped cross section, in order to thus brace the guide device (200) in an axial direction (22) against the turbine housing (110) via the channel section (243).

29. The turbine arrangement (100) according to any of the preceding embodiments, wherein the guide device (200) is formed as a single piece, in particular as a single piece as a sheet-metal part.

30. The turbine arrangement (100) according to any of the preceding embodiments, wherein the guide device (200) is formed as a sheet-metal part, in particular wherein the guide device (200) is formed from one sheet-metal part.

31. The turbine arrangement (100) according to any of embodiments 1 to 22, if at least dependent on embodiment 7, wherein the first ring element (212) and the second ring element (216) extend radially within and radially outside the guide blades (220) so as to form a major part of the inflow channel (130), in particular substantially the entire inflow channel (130).

32. The turbine arrangement (100) according to embodiment 31, wherein the first ring element (212) is designed to form at least a major part of a first channel surface (134) of the inflow channel (130), and wherein the second ring element (216) is designed to form at least a major part of a second channel surface (136), which is situated axially opposite the first channel surface (134), of the inflow channel (130).

33. The turbine arrangement (100) according to either of embodiments 31 and 32, wherein the first ring element (212) and the second ring element (216) are designed to form a radially inwardly tapering inflow channel (130).

34. The turbine arrangement (100) according to any of embodiments 31 to 33, wherein the first ring element (212) and the second ring element (216) are designed to form an inflow channel (130), the profile of which has an axial and a radial component.

35. The turbine arrangement (100) according to any of embodiments 1 to 22 or 31 to 34, if at least dependent on embodiment 7, wherein the turbine spiral (120) comprises a first volute (122) and a second volute (124) which are separated from one another in terms of flow by a partition (126), and wherein the carrier ring (210) furthermore comprises a third ring element (218) which is arranged and formed axially between the first ring element (212) and the second ring element (216) so as to run as an elongation of the partition (126) into the inflow channel (130), in particular through the inflow channel (130).

36. The turbine arrangement (100) according to embodiment 35, wherein the third ring element (218) extends from the partition (126) as far as a radially inner end (132) of the inflow channel (130), such that the inflow channel (130) is separated into two axially adjacent inflow channel sections (130a, 130b).

37. The turbine arrangement (100) according to any of the preceding embodiments, wherein the carrier ring (210) is screwed into the turbine housing (110).

38. The turbine arrangement (100) according to embodiment 37, if at least dependent on embodiment 11, in particular wherein the carrier ring (210) comprises only the first ring element (212).

39. The turbine arrangement (100) according to either of embodiments 37 and 38, wherein the carrier ring (210) has an encircling bevel (214b) on a turbine-housing-side edge on the outer circumference (214) of the first ring element (212).

40. The turbine arrangement (100) according to any of embodiments 31 to 39, wherein the guide device (200) is formed as a single piece, in particular wherein the guide device (200) is formed from one cast part.

41. The turbine arrangement (100) according to any of embodiments 31 to 39, wherein the guide device (200) is formed by a welded assembly.

42. The turbine arrangement (100) according to any of the preceding embodiments, wherein the carrier ring (210) and/or the guide blades (220) are parts from previously known designs, in particular from previously known VTG designs.

43. The turbine arrangement (100) according to embodiment 42, wherein the carrier ring (210) is selected from the best-suited VTG turbine with regard to its size, blade width and/or hole circle.

44. The turbine arrangement (100) according to either of embodiments 42 and 43, wherein the carrier ring (210) and the guide blades (220) are formed as originally separate components and connected to one another by joining, in particular cohesively, optionally wherein the carrier ring (210) and the guide blades (220) are formed as originally separate components and welded together.

45. The turbine arrangement (100) according to any of embodiments 42 to 44, wherein the guide blades (220) are connected, in particular welded or brazed, in the predetermined orientation to the carrier ring (210).

46. The turbine arrangement (100) according to any of embodiments 42 to 44, wherein the guide blades (220) are VTG guide blades and each have a journal (226), wherein the guide blades (220) are, by way of the respective journals (226), inserted into and rigidly fastened, in particular welded, in corresponding bores of the carrier ring (210) in the predetermined orientation.

47. The turbine arrangement (100) according to any of embodiments 1 to 34 or 37 to 46, wherein the turbine spiral (120) comprises a first volute (122) and a second volute (124) which open into the guide device (200) in a manner separated in terms of flow between a first turbine housing tongue (127) and a second turbine housing tongue (129).

48. The turbine arrangement (100) according to embodiment 47, wherein two of the multiple guide blades (220) are formed as tongue guide blades (221) and are arranged adjacent to the turbine housing tongues (127, 129), and optionally wherein a radially inner end section of the tongue guide blade (221) that is adjacent to the first turbine housing tongue (127) is arranged spaced apart in a circumferential direction (26) by less than 180°, in particular 175°, from a radially inner end section of the tongue guide blade (221) that is adjacent to the second turbine housing tongue (129).

49. The turbine arrangement (100) according to embodiment 48, wherein the guide device (200) is arranged and formed in the turbine housing (120) such that in each case one of the tongue guide blades (221) is arranged as an elongation of in each case one of the turbine housing tongues (127, 129), such that a separation of the volutes in terms of flow is continued in the guide device (200).

50. The turbine arrangement (100) according to embodiment 49, wherein a radially inner end of the respective turbine housing tongue (127, 129) is arranged substantially flush with a radially outer end of the respective tongue blade (221).

51. The turbine arrangement (100) according to any of the preceding embodiments 1 to 10 or 12 to 50, furthermore comprising a rotation-preventing securing means (318) which is designed to substantially prevent a rotation of the guide device (200) in a circumferential direction (26).

52. The Turbine arrangement (100) according to embodiment 51, wherein the rotation-preventing securing means (318) is formed by a pocket (318a) and a pin (318b) which engages radially into the pocket (318a).

53. The turbine arrangement (100) according to embodiment 52, wherein the pocket (318a) is recessed into a radially inwardly directed cylindrical centering surface (114) of the turbine housing (110), and wherein the pin (318b) is arranged and formed on the carrier ring (210) such that the pin (318b) engages radially outwardly into the pocket (318a) from an outer circumference (214) of the carrier ring (210).

54. A supercharging device (10) comprising:
   a compressor arrangement (320) having a compressor housing (322) and having a compressor wheel (324) which is arranged rotatably in the compressor housing (322),
   a bearing housing (310),
   a shaft (330) which is arranged rotatably in the bearing housing (310), and
   a turbine arrangement (100) according to any of the preceding embodiments, wherein the turbine wheel (140) is rotatably connected to the compressor wheel (324) via the shaft (330).

55. The supercharging device (10) according to embodiment 54, if dependent on embodiment 17, wherein the bearing housing (310) has, on a turbine-side end region (312), an axial projection (314) on which the spring element (230) and/or the heat shield (240) is mounted.

56. The supercharging device (10) according to either of embodiments 54 and 55, wherein the carrier ring (210) is centered in the bearing housing (310) by means of a plug-in connection (316), in particular by means of multiple bolts distributed in a circumferential direction (26).

57. The supercharging device (10) according to any of embodiments 54 to 56, if at least dependent on embodiment 37, furthermore comprising a heat shield (240) which is flange-mounted between the turbine housing (110) and the bearing housing (310).

LIST OF REFERENCE DESIGNATIONS

10 Supercharging device
22 Axial direction
24 Radial direction
26 Circumferential direction
100 Turbine arrangement
110 Turbine housing
112 Recess
114 Centering surface
114a Internal thread
120 Turbine spiral
122 First volute
124 Second volute 126 Partition
127 First turbine housing tongue
129 Second turbine housing tongue
130 Inflow channel
130a First inflow section
130b Second inflow section
132 Radially inner end
134 First channel surface
136 Second channel surface
140 Turbine wheel
140a Semiaxial turbine wheel
150 Turbine outlet
200 Guide device
210 Carrier ring
212 First ring element
213 Inner circumference of first ring element
214 Outer circumference of first ring element
214a External thread
214b Bevel
215 Bores
216 Second ring element
218 Third ring element
220 Guide blades
220a First blade section
220b Second blade section
221 Tongue blade
222 Leading edge
223 Inflow direction
224 Trailing edge
226 Journal
230 Spring element
232 Inner circumference of spring element
234 Outer circumference of spring element
240 Heat shield
242 Inner circumference of heat shield
243 Channel section
244 Outer circumference of heat shield
310 Bearing housing
312 Turbine-side end region
314 Axial projection
316 Plug-in connection
318 Rotation-preventing securing means
318a Pocket
318b Pin
320 Compressor arrangement
322 Compressor housing
324 Compressor wheel
330 Shaft

What is claimed:

1. A turbine arrangement (100) for a supercharging device (10), comprising:
 a turbine housing (110) which defines a turbine spiral (120) and a turbine outlet (150), wherein the turbine spiral (120) comprises a first volute (122) and a second volute (124) which are separated from one another in terms of flow by a partition (126);
 a turbine wheel (140) which is arranged in the turbine housing (110) between the turbine spiral (120) and the turbine outlet (150); and
 a guide device (200) having:
  a carrier ring (210), and
  multiple guide blades (220) which are arranged on the carrier ring (210) non-rotatably fixedly in a predetermined orientation;
 wherein the guide device (200) is arranged in an inflow channel (130) between the turbine spiral (120) and the turbine wheel (140) such that, during operation, fluids are conducted from the turbine spiral (120) through the inflow channel (130) over the guide blades (220) onto the turbine wheel (140);
 wherein the carrier ring (210) comprises a bearing housing side ring element (212) and a partition wall ring element (218), wherein the partition wall ring element (218) extends from the partition (126) as far as a radially inner end (132) of the inflow channel (130) as an elongation of the partition (126), such that the inflow channel (130) is separated into two axially adjacent inflow channel sections (130a, 130b);
 wherein the guide blades (220) are each divided into a first blade section (220a) in the first inflow channel section (130a) and into a second blade section (220b) in the second inflow channel section (130b);
 wherein the guide blades (220) of the first blade section (220a) extend from the bearing housing side ring element (212) to the partition wall ring element (218);
 wherein the guide blades (220) of the second blade section (220b) extend from the partition wall ring element (218) towards the turbine housing (110); and
 wherein said turbine arrangement (100) further comprises a spring element (230) which is arranged at a bearing housing side axially adjacent to the carrier ring (210) and which is designed to brace the guide device (200) in the axial direction (22) from the bearing housing side toward and against the turbine housing (110).

2. The turbine arrangement (100) as claimed in claim 1, wherein the guide device (200) is formed as a separate component.

3. The turbine arrangement (100) as claimed in claim 1, wherein the guide device (200) is formed as a single piece.

4. The turbine arrangement (100) as claimed in claim 1, wherein the carrier ring (210) is centered in the turbine housing (110).

5. The turbine arrangement (100) as claimed in claim 1, wherein the guide blades (220) of the second blade section (220b) are braced against the turbine housing (110).

6. The turbine arrangement (100) as claimed in claim 1, wherein the carrier ring (210) is centered on a radially inwardly directed cylindrical centering surface (114) of the turbine housing (110), and wherein the carrier ring (210) is centered, by way of an outer circumference (214) of the bearing housing side ring element (212), on an inner circumference of the centering surface (114).

7. The turbine arrangement (100) as claimed in claim 1, wherein the carrier ring (210) is configured to be centered in a bearing housing (310) of the supercharging device (10) by means of a plug-in connection (316).

8. The turbine arrangement (100) as claimed in claim 7, wherein the carrier ring (210) is configured to be centered in the bearing housing (310) of the supercharging device (10) by means of multiple plug-in elements distributed in a circumferential direction (26).

9. The turbine arrangement (100) as claimed in claim 1, furthermore comprising a rotation-preventing securing means (318) which is designed to substantially prevent a rotation of the guide device (200) in a circumferential direction (26).

10. The turbine arrangement (100) as claimed in claim 1, wherein the guide blades (220) project as far as a short distance in front of the turbine wheel (140).

11. The turbine arrangement (100) as claimed in claim 2, wherein the guide device (200) is inserted into the turbine housing (110).

12. The turbine arrangement (100) as claimed in claim 10, wherein the guide blades (220) project as far as the radially inner end (132) of the inflow channel (130).

13. The turbine arrangement (100) as claimed in claim 10, wherein the guide blades (220) are fixed to the carrier ring (210) in the predetermined orientation such that said guide blades guide fluids onto the turbine wheel (140) in an inflow direction (223) at an angle (a) relative to the circumferential direction (26) which is optimized for a desired operating point.

14. The turbine arrangement (100) as claimed in claim 1, wherein the spring element (230) is further defined as a disk spring.

* * * * *